(12) United States Patent
Betz et al.

(10) Patent No.: US 7,224,721 B2
(45) Date of Patent: May 29, 2007

(54) SYSTEM FOR DIRECT ACQUISITION OF RECEIVED SIGNALS

(75) Inventors: John Betz, Bedford, MA (US); Paul Capozza, Bedford, MA (US); John Fite, Clifton, VA (US)

(73) Assignee: The MITRE Corporation, McLean, VA (US)

( * ) Notice: Subject to any disclaimer, the term of this patent is extended or adjusted under 35 U.S.C. 154(b) by 844 days.

(21) Appl. No.: 10/269,254

(22) Filed: Oct. 11, 2002

(65) Prior Publication Data

US 2004/0071200 A1    Apr. 15, 2004

(51) Int. Cl.
*H04B 1/00* (2006.01)

(52) U.S. Cl. ............ 375/152; 375/142; 375/143; 375/150; 375/343; 375/350

(58) Field of Classification Search ........ 375/152, 375/142, 143, 150, 343, 350
See application file for complete search history.

(56) References Cited

U.S. PATENT DOCUMENTS

| 4,639,932 | A |   | 1/1987  | Schiff |
|-----------|---|---|---------|--------|
| 4,998,111 | A | * | 3/1991  | Ma et al. ............ 342/352 |
| 5,473,759 | A | * | 12/1995 | Slaney et al. ............ 704/266 |
| 5,943,363 | A |   | 8/1999  | Hanson et al. |
| 5,987,059 | A | * | 11/1999 | Harrison et al. ........... 375/150 |
| 6,028,883 | A |   | 2/2000  | Tiemann et al. |
| 6,041,280 | A |   | 3/2000  | Kohli et al. |
| 6,233,273 | B1| * | 5/2001  | Webster et al. ........... 375/148 |
| 6,292,748 | B1| * | 9/2001  | Harrison ............ 701/213 |
| 6,909,738 | B2| * | 6/2005  | Akopian et al. ............ 375/142 |

OTHER PUBLICATIONS

Overview of the GPS M Code Signal by B. Barker, et al., ION NTM 2000, Jan. 26-28, 2000, Anaheim, CA.
Predicting Performance of Direct Acquisition for the M-Code Signal by P. Fishman, et al., ION NTM 2000, Jan. 26-28, 2000, Anaheim, CA.
The Offset Carrier Modulation for GPS Modernization by J. Betz, The Mitre Corporation, McLean, VA.
GPS Receivers by A. Van Dierendonck, 1995, AJ Systems, Los Altos, CA.
Digital Communications, 3rd Ed. by J. Proakis, Dept. of Electrical and Computer Engineering, Northeastern University, Boston, MA.

* cited by examiner

*Primary Examiner*—Dac Ha
*Assistant Examiner*—Ted M. Wang
(74) *Attorney, Agent, or Firm*—Sterne Kessler Goldstein & Fox PLLC

(57) ABSTRACT

Signal processing architectures for direct acquisition of spread spectrum signals using long codes. Techniques are described for achieving a high of parallelism, employing code matched filter banks and other hardware sharing. In one embodiment, upper and lower sidebands are treated as two independent signals with identical spreading codes. Cross-correlators, in preferred embodiments, are comprised of a one or more banks of CMFs for computing parallel short-time correlations (STCs) of received signal samples and replica code sequence samples, and a means for calculating the cross-correlation values utilizing discrete-time Fourier analysis of the computed STCs. One or more intermediate quantizers may optionally be disposed between the bank of code matched filters and the cross-correlation calculation means for reducing word-sizes of the STCs prior to Fourier analysis. The techniques described may be used with BOC modulated signals or with any signal having at least two distinct sidebands.

42 Claims, 13 Drawing Sheets

SYSTEM FOR DIRECT ACQUISITION OF RECEIVED SIGNALS

FIELD OF THE INVENTION

The present invention relates generally to signal processing, and more particularly to novel architectures for performing direct acquisition of spread spectrum signals using long codes, including signals with binary offset carrier modulation. The invention further relates to signal acquisition methods resulting in a high degree of parallelism, such as can be achieved through the use of code matched filter banks and other hardware sharing techniques. The invention has applicability to radionavigation systems, communications, and radar systems.

BACKGROUND OF THE INVENTION

The use of spread spectrum technology for radionavigation or communications is well known in the electrical engineering arts. Spread spectrum communication is advantageous in communication applications requiring high reliability in a noisy environment. There are several types of spread spectrum systems, including direct sequence spread spectrum ("DSSS") systems, frequency hopping systems, time hopping systems, pulse frequency modulated (or chirp) systems, and various hybrids. Of these, DSSS systems and frequency hopping systems are perhaps the more widely implemented. One system that uses DSSS technology is the Global Positioning System ("GPS"). The GPS is a constellation of satellites orbiting the earth and transmitting DS-SS signals. Receivers process signals from multiple satellites in order to determine their own position and location. GPS downlink signals are currently transmitted in two frequencies in L-band: L1, centered at 1575.42 MHz, and L2, centered at 1227.6 MHz.

When GPS was originally designed, it comprised two different downlink signals for radionavigation, corresponding to two different services. The precise positioning service (PPS), was intended for authorized (primarily US and Allied military) users, and employs the precision/encrypted (P(Y)) code signal. The standard positioning service (SPS) is available for use by any user worldwide, and employs the coarse acquisition (C/A) code signal. While the C/A code signal is currently transmitted only on L1, the P(Y) code signal is transmitted on both L1 and L2.

M-Code Signal for GPS and BOC Modulations

As part of GPS Modernization, the U.S. Government is adding new signals in addition to the existing GPS signals. The C/A-code signal (or a signal with identical modulation but different spreading code and data modulation) will be transmitted on L2. In addition, a new signal for military use (the M-code signal) will be transmitted on both L1 and L2. The M-code signal is designed to provide additional capabilities and performance, especially enhanced jamming resistance, while remaining compatible with reception of current GPS signals.

The M-code signal uses a novel modulation, denoted binary offset carrier ("BOC"), which contributes both to performance and to spectral compatibility with existing signals. BOC modulations are described by their subcarrier rate and their spreading code rate; the M-code signal uses a subcarrier rate of 10.23 MHz and a spreading code rate of 5.115 MHz. Other developments of advanced radionavigation systems, including the European Galileo development, are also considering the use of BOC modulations, possibly with different subcarrier rates and spreading code rates. One critical characteristic of BOC modulations is that they typically offer much narrower correlation function peaks, providing better ranging accuracy in noise and multipath. For a more detailed description of BOC signals and their properties, see John W. Betz, *The Offset Carrier Modulation for GPS Modernization*, Proceedings of ION 1999 National Technical Meeting, Institute of Navigation; Brian C. Barker et al., *Overview of the GPS M Code Signal*, Proceedings of ION 2000 National Technical Meeting, and John W. Betz, *Binary Offset Carrier Modulations for Radionavigation*, Navigation: The Proceedings of the Institute of Navigation, Fall/Winter 2001–2002. The contents of these articles are hereby incorporated by reference.

Direct Acquisition of Signals with BOC Modulations

GPS satellites that transmit the M code signal will be launched as early as in 2003. New receivers are being developed for reception and processing of the M-code signal. An essential aspect of GPS signal receiver processing is signal acquisition, where the receiver aligns its internal timing and frequency to the precise values of the received signal. Before acquisition begins, the receiver's internal timing and frequency references are in error by certain amounts. The sizes of these errors depend upon a number of factors, including operational conditions, receiver design, and signal design.

Direct acquisition, where the receiver performs acquisition without use of transmitted acquisition aids, involves cross-correlating a locally generated reference signal against time and frequency-shifted versions of a received signal. In DSSS processing, the reference signal is a replica of the pseudo-noise (PN) sequence code used to spread the spectrum of the received signal at a transmitter. The ability of a DSSS system to suppress radio-interference is directly proportional to the ratio of the PN code symbol, or "chip", rate to the data rate. The cross-correlation over both time lag and frequency offset is termed a complex ambiguity function. The coordinates of the location where the magnitude of the cross-ambiguity function achieves a maximum (or "peak") reveal the time lag and frequency offset that align the reference signal with the received signal.

Direct acquisition is the baseline approach for acquisition of the M code signal. FIG. 1 is helpful in understanding direct acquisition processing. Direct acquisition involves a search over a set of time and frequency values that represent the receiver's uncertainty region 102, which is typically quantized into discrete time and frequency cells 104. The receiver performs multiply-accumulate processing to compute a test statistic (or "metric") for each time-frequency cell 104. Appropriate time lags (or "code offsets") and frequency offsets are determined by testing the metrics to determine if they exceed a predetermined threshold indicating synchronization. All cells 106 whose metrics exceed the threshold typically undergo a verification process before the acquisition processing declares that the signal has been acquired.

Major contributors to time uncertainty window 108, which can vary from a few spreading code periods to millions of spreading code chip periods, include the absolute and relative inaccuracy of system clocks, an unknown distance between the transmitter and receiver, and the code period. Typically, the time-domain extent of a cell 110 is one-half a chip period (i.e., the distance between the cross-ambiguity function's peak and its first zero).

Unknown Doppler shifts and the drift of a receiver's oscillator are major sources of frequency uncertainty 112 and can range from tens of hertz for stationary transmitters and receivers to kilohertz for receivers and transmitters installed in high-speed platforms. The frequency-domain extent of a cell 114 is typically half the reciprocal of the coherent integration time being used in direct acquisition processing.

The search over the time and frequency uncertainty region 102 can be performed as a serial search or a parallel search. One difference between serial search methods and parallel acquisition methods is the number of cells 104 searched at one time. Serial search methods compute and analyze one time-frequency cell 104 at a time. Parallel methods, on the other hand, are primarily distinguished by the selected implementation method of short-time correlation processing and by the number of cross-correlations being calculated simultaneously. Parallel methods compute quantized correlation "tiles" 116 containing multiple time-frequency cells 104. For example, tiles could be dimensioned to be 5 milliseconds by 800 Hz in size.

Parallel methods are frequently implemented in hardware by using code-matched filters (CMFs), which calculate new correlation samples at a rate proportional to the rate at which the received signal is sampled. CMFs use finite-impulse response-like structures to correlate input signals fed into them with the locally-generated reference signal. Within CMFs, spreading code values are treated as filter taps and are stored in semi-permanent registers. CMFs are versatile because they can be implemented using time-domain methods, frequency-domain methods, or a combination of the two.

Existing designs for direct acquisition process the signal over its entire bandwidth, using digital processing with a sampling rate established to ensure that at least two samples fall on the peak of the cross-ambiguity (or "correlation") function. Since the M-code signal's correlation function has a narrow peak, this approach would require high sampling rates. And because the rate of arithmetic operations needed for direct acquisition processing is roughly proportional to the square of the sampling rate, existing approaches lead to computationally complex methods for direct acquisition of BOC modulations. In fact, skilled practitioners in spread spectrum signal acquisition have indicated that unaided direct acquisition using CMF architectures of the M code signal is extremely complex, and implementations would not be practical for many years.

SUMMARY OF THE INVENTION

The present invention provides numerous hardware efficient cross-correlation designs and signal processing architectures (SPAs) incorporating those designs that achieve a high degree of parallelism in the acquisition phase of processing received signals, such as DSSS signals, with special capabilities for binary offset carrier (BOC) modulations. The parallelism is achieved without increasing the hardware required by the correlation designs or SPAs by a commensurate amount. Use of SPAs in accordance with the present invention allows a receiver to quickly align itself with the received signal, in both time and frequency, even in the presence of severe interference. The present invention is able to achieve search speeds that are several times faster than existing designs known to the applicants.

One aspect of the invention's novelty is in the way it takes advantage of upper and lower sidebands of BOC modulations, such as are present in the GPS M code signal. Specifically, the upper and lower sidebands can be treated as two independent signals with identical spreading codes. This enables the use of lower sample rates compared to conventional direct acquisition designs.

Another aspect of the invention involves an achieved high degree of hardware (e.g., multiplier, adder and data shift register) reuse for code matched filter banks (CMFBs) employed in a number of the embodiments. These make advantageous use of separate processing of in-phase (I) and quadrature (Q) phases of the carrier signal, upper and lower sidebands, and odd and even sampling.

The techniques described below allow minimization of on-chip memory in application specific integrated circuits (ASIC's) or field programmable gate arrays (FPGA's) implementing the cross-correlation means and SPAs. Selected embodiments require no intermediate on-chip or off-chip memory for partial coherent sums, and use off-chip memory only for the purpose of storing non-coherent integration results.

In a first embodiment, the present invention provides a SPA for acquiring a received DSSS signal. The SPA includes a means for sampling the received DSSS signal at a predetermined sampling rate, and means for cross-correlating, in a parallel fashion, time and frequency shifted versions of the sampled DSSS signal with samples of a locally generated replica of a psuedo random noise (PN) code sequence used to spread the spectrum of the DSSS signal at a transmitter, thereby obtaining a set of cross-correlation values. An optional code Doppler compensation means coupled to the cross-correlating means pre-processes the cross-correlation values in order to compensate for misalignment effects resulting from time-companding of the received DSSS signal. Coupled to the code Doppler compensation means is a means for non-coherently integrating groups of the compensated cross-correlation values in order to calculate correlation metrics, the sum of the magnitudes of which are evaluated for a correlation peak (or "maximum").

The cross-correlation means, in preferred embodiments, is comprised of a one or more banks of CMFs for computing parallel short-time correlations (STCs) of the received signal samples and replica code sequence samples, and a means for calculating the cross-correlation values utilizing discrete-time Fourier analysis of the computed STCs. One or more intermediate quantizers may optionally be disposed between the bank of code matched filters and the cross-correlation calculation means for reducing word-sizes of the STCs prior to Fourier analysis. This has the benefit of reducing hardware complexity of these embodiments for all subsequent processing (e.g., the Fourier analysis, code Doppler compensation, non-coherent integration, and correlation detection).

The CMFs may also re-use multiply-and-accumulate hardware in cross-correlation by interleaving in-phase (I) and quadrature (Q) components of the received DSSS signal samples and computing the STCs for the interleaved components in a pipelined fashion. In this embodiment, the CMFs operate at twice the received signal sampling rate, and each CMF is further comprised of two data shift registers per tap for holding the interleaved components.

In selected embodiments, the SPA further comprises means for digitally selecting and re-sampling two or more sidebands from a received DSSS signal having multiple sidebands, as do binary offset carrier (BOC) signals. Samples of each selected and re-sampled sideband may similarly be interleaved and processed by the CMFs in a pipelined fashion. In this embodiment, each CMF has additional data shift registers as needed for holding the interleaved sideband data, and each operates at a rate equal to, the product of twice the number of selected sidebands and the predetermined re-sampling rate. If four sidebands are selected, for example, the CMFs will operate at four times the received signal re-sampling rate, resulting in a hardware re-use factor of four (4). If I and Q components of each of these four sidebands are interleaved and the code matched filters operated accordingly faster, then the hardware re-use factor may be increased to eight (8).

The cross-correlation means may further comprise a means for re-sampling the received DSSS signal at a rate equal to an integer multiple of the nominal chip rate of the spreading code, and each CMF has a corresponding summing network including hardware means for storing partial correlation sums and adding partial correlation sums from previous clock cycles to compute the cross-correlation values. This re-use of partial correlation sums results in a reduction of multipliers (and associated summing hardware) required for each CMF by a factor equal to the integer multiple.

The optional code Doppler compensation means further comprises circuitry for applying delays to input streams of the cross-correlation values corresponding to frequency-shifted versions of the received DSSS signal and the replica code sequence and for selecting appropriate delays to be applied based upon a number of non-coherent integrations performed. In preferred embodiments, this is accomplished through the use of a plurality of integer and fractional delay lines for coarse and fine adjustments, respectively, of Doppler frequency dependent delays. Code Doppler compensation circuits are initialized and incremented or updated for a variable number of non-coherent integrations, preferably through the use of a table of coefficients and an integration counter.

In yet another embodiment, the present invention provides a SPA for acquiring a received multiband input signal, comprised of a means for selecting multiple sidebands from the received multiband input signal, a means for cross-correlating a replica of a PN code sequence used to spread the spectrum of the transmitted signal with time and frequency shifted versions of each selected sideband to obtain cross-correlation values, a means for non-coherently combining the cross-correlation values to obtain correlation metrics, and means for detecting whether the magnitudes of the correlation metrics exceed a detection threshold. The SPA of this embodiment may also include a means for down-sampling each selected sideband at a predetermined down-sampling rate to obtain the versions of each selected sideband. It may also include independently controllable quantizers for quantizing the versions of each selected sideband, and means for controlling a loading factor of the quantizers. The loading factor control mechanism may be an automatic gain control or similar circuit.

The non-coherent integration means controls the relative timing between the replica code sequence and the received signal, realigning the replica code sequence to the chip boundary at the start of each new time uncertainty. Code sequence segments overlapping in time between groups of cross-correlation values compensate for invalid samples resulting from code Doppler processing, post peak-detection idle time resulting from situations in which a correlation peak is detected at the end of a correlation tile, and changes in the number of samples available for processing as a result of code Doppler effects. The non-coherent integration means includes a mechanism for: loading and swapping of consecutive non-contiguous code sequence segments into and out of CMF dual register banks to support seamless switching between processing multiple data blocks of a correlation tile; controlling the realignment of the received signal to the chip boundary along with the local replica code sequence when switching time uncertainties; controlling initiation of a new data block for a given time offset during the integration process; controlling a signal that distinguishes invalid data (from the code Doppler processing) and valid data at the end of the integration process; controlling discarding of unused samples at the end of the integration process for a given time uncertainty; and coordinating the initiation of the integration process for the next time uncertainty.

DETAILED DESCRIPTION OF CERTAIN PREFERRED EMBODIMENTS OF THE INVENTION

Preferred embodiments of the invention will now be described with reference to the accompanying drawings.

Although much of the description that follows addresses GPS receivers for BOC modulated signals, and specifically M code GPS signals employing BOC (10,5) modulation, the description of specific embodiments is intended for exemplary purposes only and by no means meant to be limiting. For example, it will be understood by artisans that the cross-correlation architectures described are also suitable for use in systems (e.g., radar) wherein the signals to be correlated will not be spread spectrum signals.

Each of the cross-correlation and signal processing architectures disclosed herein enable an increase in hardware efficiency when compared to existing technologies. Each architecture employs a separate technique that may be found alone in a SPA or in combination with the other described innovations. Simplifications described below lend themselves to integrated circuit designs that are feasible to implement while providing optimal performance.

To facilitate understanding, a description of an acquisition SPA incorporating a number of the innovations will be described, followed by a more detailed description of each feature of the SPA. A couple of the innovations will be described, for the purpose of clarity, in isolation from the first SPA described, but artisans will readily understand how these techniques could be incorporated.

Figure 1:
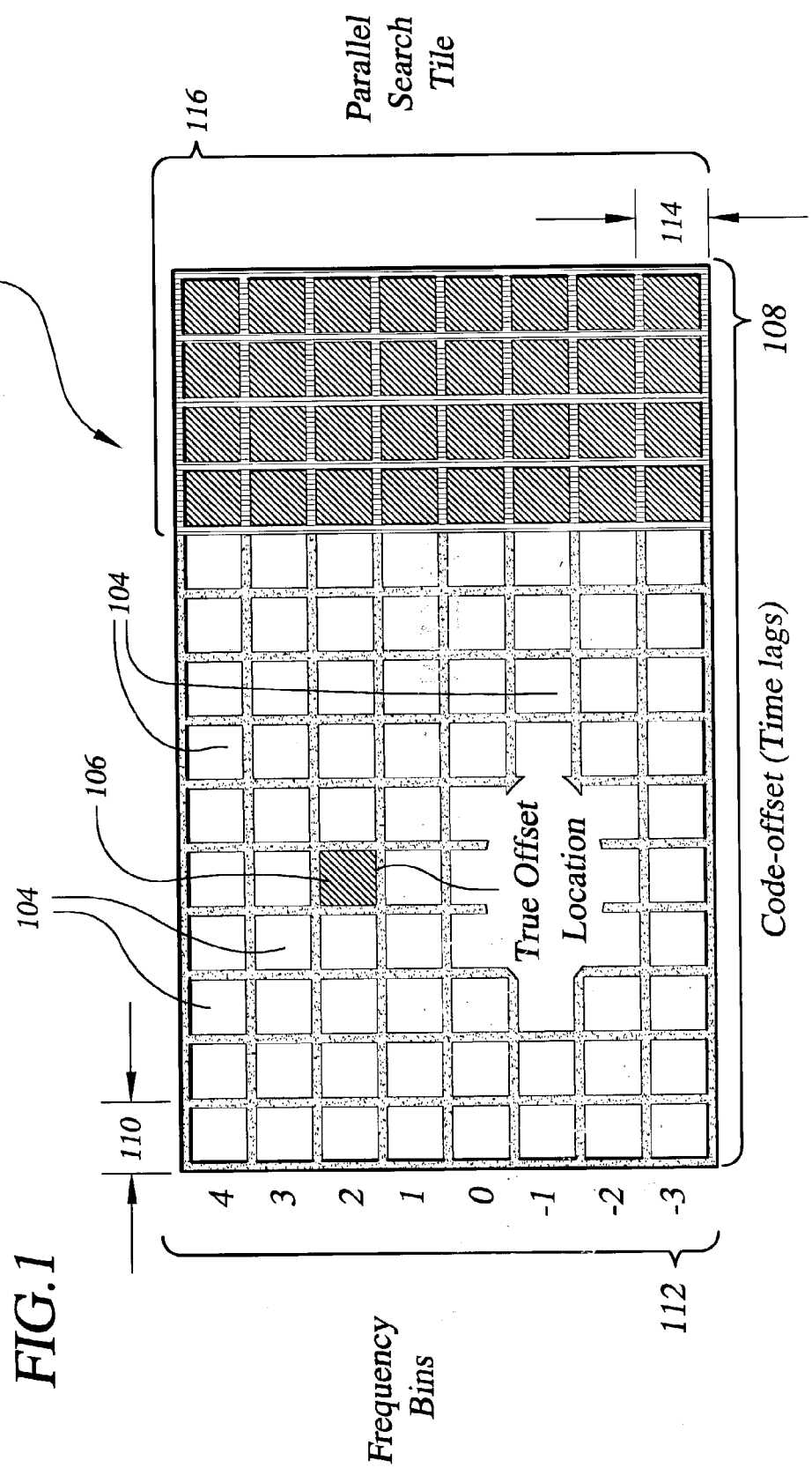
FIG. 1 is an illustration of a time frequency uncertainty region comprised of a number of individual cells and a group comprising a parallel search tile.
Figure 2:
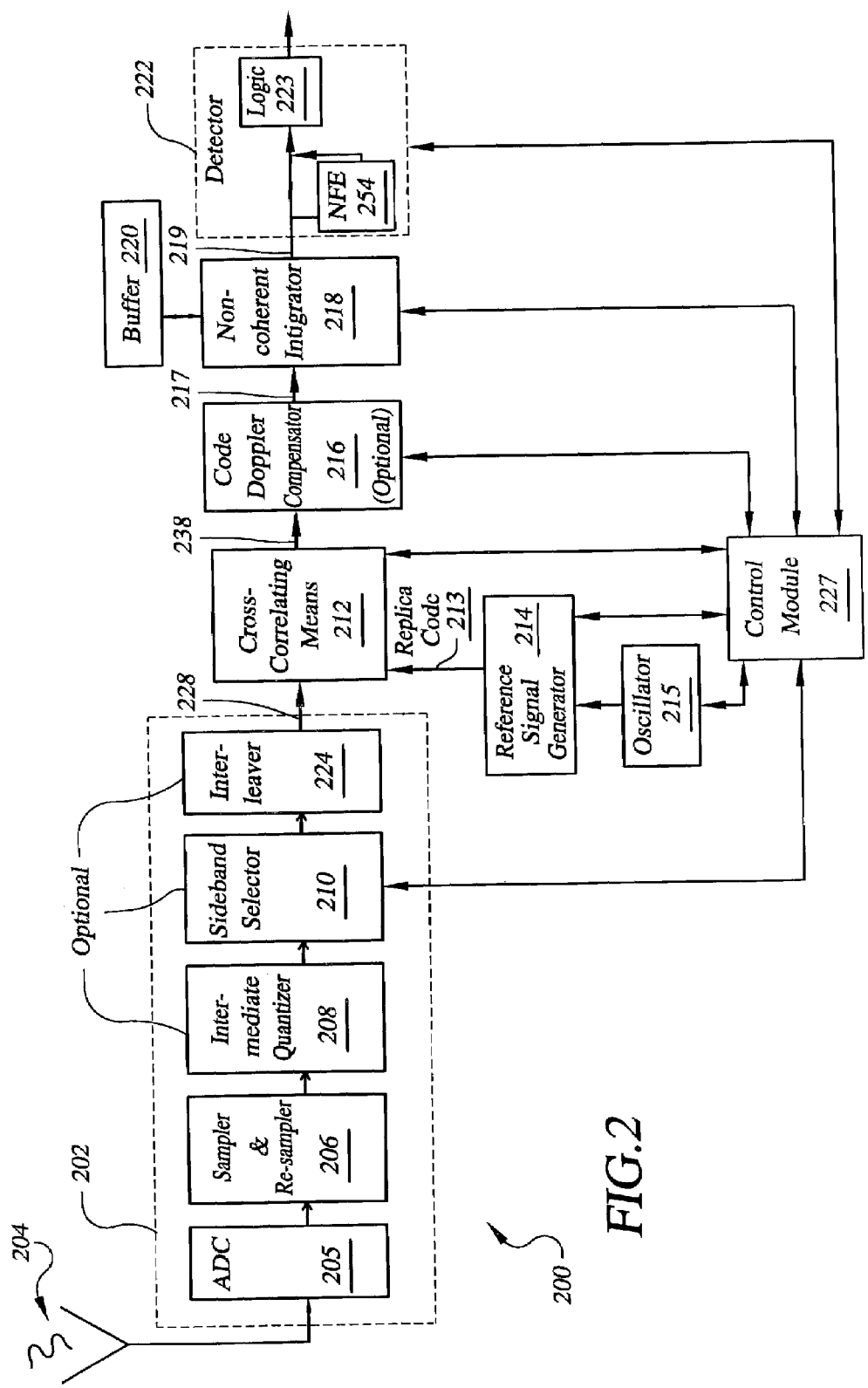
FIG. 2 is a block diagram illustrating aspects of an embodiment of a signal processing architecture in accordance with the present invention.

Acquisition SPA Employing Parallel Cross-Correlation Engine Followed By Doppler Compensation And Non-Coherent Integration A SPA 200 for acquiring a DSSS signal in a parallel fashion in accordance with one embodiment of the present invention is illustrated in FIG. 2. SPA 200 includes a pre-conditioner 202 the received DSSS signal 204, including preferably an analog-to-digital converter (ADC) 205, means 206 for sampling and/or re-sampling at predetermined sampling rates, one or more optional intermediate quantizers 208, sideband selection module 210, and interleaver 224. A cross-correlation means 212 cross-correlates time and frequency shifted versions of the pre-conditioning means output 228 with samples of a replica PN code sequence 213 obtained from a local PN code generator 214. Then an optional code Doppler compensator 216 compensates for signal companding effects due to Doppler, and is followed by a non-coherent integrator 218, having a memory buffer 220, that integrates multiple compensated cross-correlation values 217 representing searches of particular time and frequency offsets. Detector module 222 accepts the output 219 of the non-coherent integrator 218, which comprises test statistics (or metrics), for discovery of correlation peaks through comparison to a threshold.

Preconditioner 202 prepares and pre-processes the received signal 204 in preparation for cross-correlation. In various embodiments, sampling means 206 can perform received signal sampling at a predetermined rate using ADC 205, and re-sampling of in-phase (I) and quadrature (Q) phase components of the sampled signals. One or more intermediate quantizers 208 are employed in some embodiments for quantizing the sampled (or re-sampled) data. And certain embodiments, as will be described below, include sideband selection module 210 for selecting one or more sideband of multiple-sideband received signals. Those embodiments that employ sideband selection and/or I/Q re-sampling also include interleaver 224 for combining the resulting multiple sample streams for input into the cross-correlation means 212.

The cross-correlation means 212 cross-correlates in a parallel fashion, time and frequency shifted versions of the sampled received signal with samples of the locally generated replica of a pseudo random noise (PN) code sequence used to spread the spectrum of the transmitted DSSS signal. The cross-correlation means 212 can be implemented using active correlators (e.g. multiply-accumulators) passive correlators (e.g. CMFs), or hybrids that combine both active and passive means (e.g. a single CMF performing short-term correlations followed by a bank of accumulators to accumulate the short-term correlations). In each embodiment, correlation across frequency can be achieved by using backend discrete Fourier analysis (e.g. using an Fast Fourier Transform (FFT), Discrete Fourier Transform (DFT), Winograd Fourier Transform, or a Walsh Transform).

In addition, non-coherent integrator (NCI) 218 may be used to extend the ability of the receiver to acquire DSSS signals in high levels of noise and interference. This is accomplished by adding a pre-determined number of correlation blocks to form a single time-frequency tile. Each correlation block is a set of correlation vectors generated by the CMFB. The correlation block is dimensionally identical to the time-frequency tile. During long non-coherent integrations, code Doppler compensator 216 can be used to improve detection performance. Code Doppler compensator 216 is coupled to the cross-correlation means 212 and pre-processes cross-correlation values output by the cross-correlation means 212 in order to compensate for misalignment effects resulting from time-companding of the received DSSS signal. NCI 218 integrates groups of the compensated cross-correlation values to obtain correlation metrics.

After non-coherent integration, the detector module 222 is employed to detect whether the correlation metrics exceed a detection threshold, thereby determining whether the DSSS signal has been acquired. Detector module 222 includes noise floor estimator 254 for estimating the magnitude of the average of cross-correlation values when the received signal and the replica signal are not aligned, and dection logic 223. Herein, this average value is referred to as the noise floor. A detection threshold is calculated by multiplying the noise floor by a detection threshold offset that is dependent on the desired number of false alarms per second.

Cross-Correlation Using A Code-Matched Filter Bank Correlator

Of the several ways of computing cross-correlations in a parallel fashion, the preferred method is to use a Code-matched filter Bank Correlator (CMFBC). Simplified versions of an SPA architecture that uses CMFBC for cross-correlation, without the present innovations, can be found in M. K. Sust, et al., "Rapid Acquisition Concept for Voice Activated CDMA Communications," *IEEE Globecom* 90, December 1990, E. Sourour, et al., "Direct-Sequence Spread-Spectrum Parallel Acquisition in Nonselective and Frequency-Selective Rician Fading Channels," *IEEE Journal on Selected Areas in Communications*, Vol. 10, No 3., April 1992, and G. R. Povey, et al., "Simplified matched filter receiver designs for spread spectrum communications applications," *Electronic and Communication Engineering Journal*, April 1993, the contents of which are here incorporated by reference in their entirety.

Figure 3:
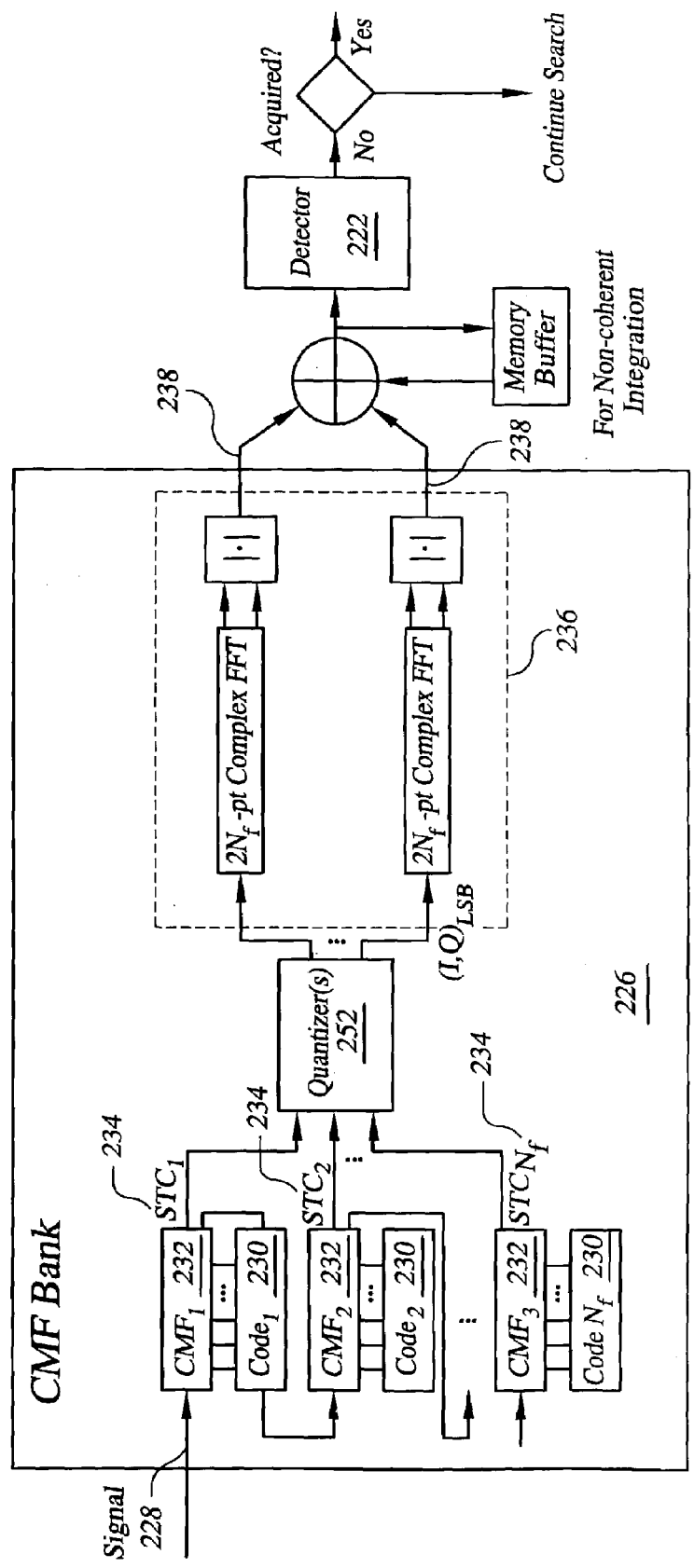
FIG. 3 is a block diagram illustrating additional aspects of an embodiment of a signal processing architecture in accordance with the present invention.

FIG. 3 illustrates an example embodiment of a CMFBC 226 used to perform cross-correlations of the digitized signal output 228 from the preconditioning means 202 with stored samples 230 of the replica code 213 generated by code generator 214 in a fully parallel fashion. CMFBC 226 is comprised of a bank of $N_f$CMFs 232 that compute short-term correlations 234 (STCs) of length $N_T$, followed by an FFT structure 236 that coherently integrates the STCs 234 across different frequency offsets, thereby computing a series of test statistics 238. The purpose of one or more quantizers 252 inserted between the bank of $N_f$CMFs 232 and FFT structure 236 will be described below.

Figure 4:
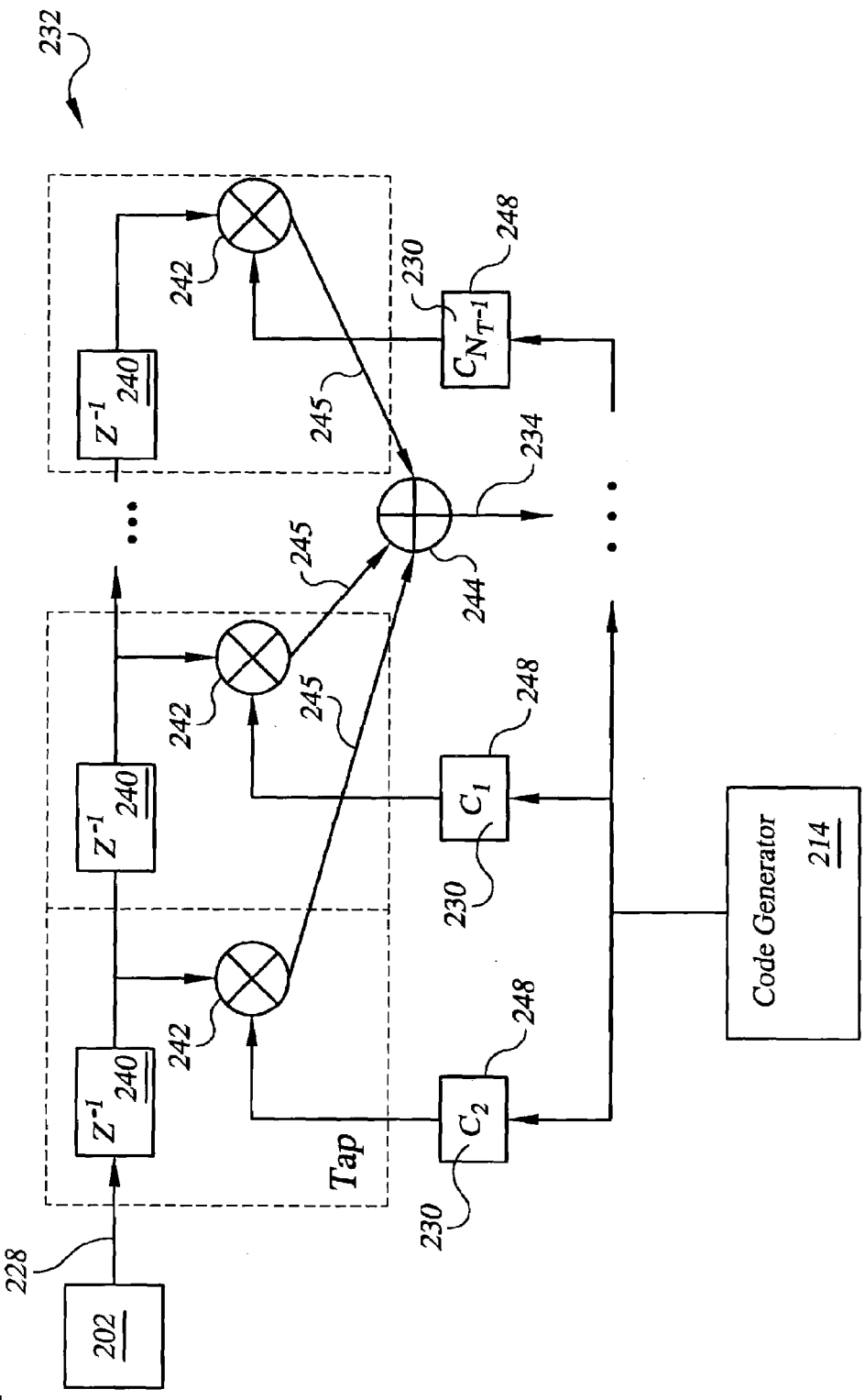
FIG. 4 is a block diagram illustrating aspects of the operation of a cross-correlation means in accordance with the present invention.

As depicted in FIG. 4, each CMF 232 is comprised of one or more data shift registers 240, code tap registers 248 for storing replica code samples 230, an array of multipliers 242, and a supporting summing network 244 (e.g., an adder tree represented for simplicity purposes as a single adder element) for summing partial correlation products. Summing network 244 is actually comprised of $$\sum_{i=0}^{\log_2 N_T} 2^i$$

adder elements.

Each CMF 232 performs a correlation of the stored replica code sequence samples 230 with differently delayed versions of pre-conditioner output signal 228. The different delays can be implemented with a $N_T$ tap delay line coupled to the output of preconditioner 202. As will be described in more detail below, in selected embodiments pre-conditioner output signal 228 may be in-phase (I) and quadrature (Q) components of the upper and lower sidebands of received signal 204. This represents four filtering operations each requiring $N_T$ taps. Since the same replica code sequence samples 230 are used by each CMF 232, a potential for hardware optimization exists. Digitized signal data is written sequentially into the data memory as it becomes available. In each CMF 232, the inner product between the digitized signal 228 and replica samples 230 for a given code offset is generated all at once. Each element of the input signal data shift-register 240 is multiplied by the corresponding element of the tap in the code-tap registers 248 using a corresponding multiplier in the array of multipliers 242. The summing network 244 then sums the multiplier output signals 245.

When all the multiply-accumulate (MAC) operations needed for the coherent integration are implemented in hardware, there is no need for intermediate storage to cache partial cross-correlation sums. This is in contrast to existing architectures that use parallel active correlators or the hybrid active-passive cross-correlation means, which reuse arithmetic resources for computing the coherent integration and suffer a large penalty for intermediate memory storage. Their reuse of arithmetic resources also results in a much longer signal acquisition time. The PN code sequence samples 230 are not updated at each clock cycle, but are treated as filter taps and stored in the semi-permanent code-tap registers 248.

Referring again to FIG. 3, the bank of $N_f$CMFs 232 simultaneously computes all the partial STCs 234 needed by the backend FFT structure 236. It is the ability to calculate all the needed partial cross-correlation values 234 at the same time that assists in making the CMFBC 226 (and SPA 200) a fast solution and the only solution not requiring intermediate memory to store partial correlation sums. Rather than employing one large CMF, $N_f$CMFs 232 of length $N_T$ are used to calculate STCs 234 on different segments of the input signal 228 and replica code data. $N_T$ is selected based on $$N_T = (N_i * F_s)/N_f$$

where $N_I$ is the desired coherent integration time, $F_S$ is the rate of received signal sampling, and $N_f$ is the number of short time CMFs.

For each new input signal 228, each CMF 232 computes one $N_T$-length STC 234. The STC length $N_T$ is designed such that $F_s/N_T$ is greater than or equal to the extent of frequency uncertainty to be searched in parallel. A $2*N_f$-point FFT (zero padded) is then applied to the STCs 234 by backend FFT structure 236. Zero-padding is a convenient way of interpolating between frequency bins and reducing scalloping loss. This provides coherent processing gain while resolving the desired frequency uncertainty with a proper frequency resolution. After FFT processing, a magnitude estimator is utilized for each frequency band in preparation for further non-coherent processing.

CMF Hardware Sharing for Processing I and Q Signal Components

Figure 5:
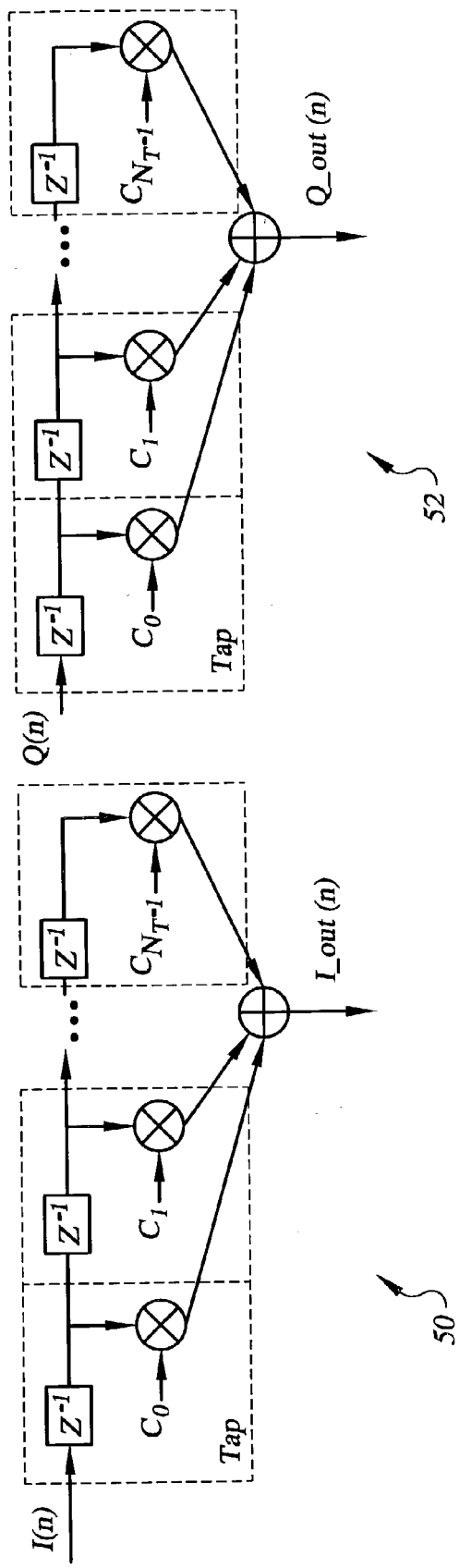
FIG. 5 is a block diagram illustrating aspects of a typical code matched filter design existing in the prior art.

Prior art techniques employ separate dedicated hardware for processing in-phase (I) and quadrature phase (Q) components of received signals. This is illustrated in FIG. 5, wherein the I and Q components are shown employing separate sets of correlating hardware 50, 52.

Figure 6:
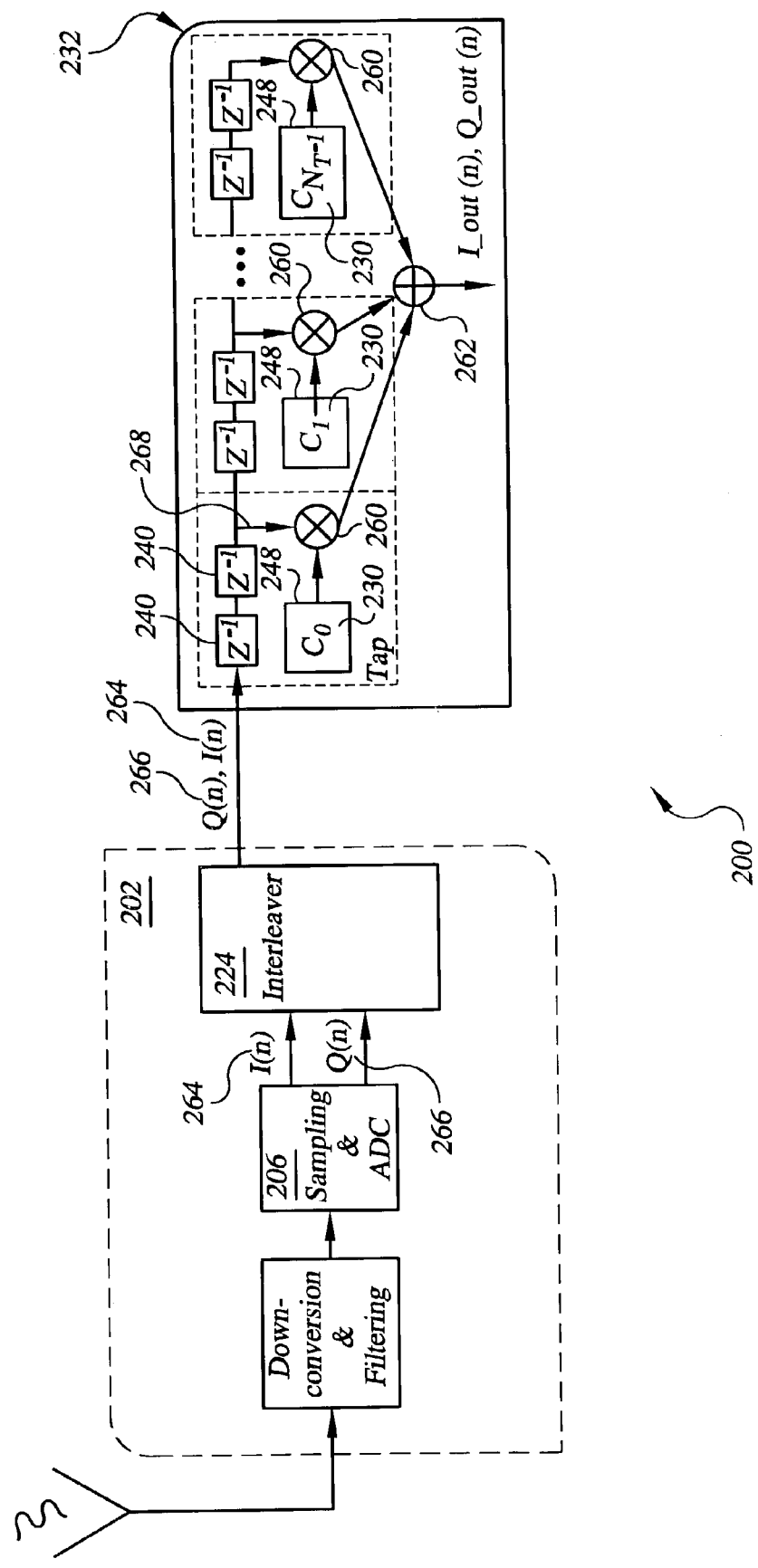
FIG. 6 is a block diagram illustrating aspects of a signal processing architecture employing hardware sharing through I and Q interleaving.

In contrast, and with reference to FIG. 6, selected embodiments of SPA 200 employ one or more CMFs 232 that re-use multipliers 260 and summing network 262 hardware in cross-correlating the replica code sequence samples 230 with I components 264 and Q components 266 of the pre-conditioned received DSSS signal 204. A simplified description of the process by which the I and Q components are obtained is as follows. Following down-conversion and filtering, the received signal 204 is digitally converted by ADC 205 and sampled at a predetermined sampling rate by sampling module 206 of preconditioner 202 to obtain the I and Q components 264,266. The I and Q components are then interleaved (by interleaver 224) for processing in a pipelined fashion by one or more CMFs 232. In order to process twice the input data, the one or more CMFs 232 of this embodiment operate at twice the sampling rate at which received signal 204 was sampled. Additionally, each of the one or more CMFs 232 has two data shift registers 240 per filter tap 268 for temporarily storing the interleaved I and Q components while other components are being correlated.

Illustrated in FIG. 6 is a CMF 232 that performs a cross-correlation of the I and Q phase components 264, 266 with a sample of the replica code 230. As a result, a filter structure can be implemented that reuses a single one of the multipliers 260 for two cross-correlations. Note that although the number of input signal data shift registers 240 remains constant, this optimization results in a factor of two reduction in the required number of multipliers 260 and reference code registers 248, and reduces an associated number of required summing network 262 adders. Since CMF hardware dominates the size of any ASIC or FPGA implementing the present invention, pipelining the I and Q samples processing yields an overall reduction in chip hardware by approximately a factor of two.

CMF Hardware Sharing for Processing Sampled Reference PN Codes

The preferred means for implementing a CMF 232 in accordance with the present invention employs an optimized summing network with a reduced hardware requirement. In certain embodiments, sampling module 206 includes means for re-sampling the received signal 204 at a rate equal to an integer multiple of the nominal chip (or "spreading code") rate applied to the signal at the transmitter. Each CMF 232 employed in these embodiments has a plurality of multipliers whose required number may be divided by the integer multiple selected for a particular CMF design. Each summing network is adapted to store partial correlation sums and to add partial correlation sums from previous clock cycles in computing the cross-correlation values.

Assuming the received signal 204 is sampled at approximately M times the rate of the replica code sequence (i.e., the spreading code) signal c, and the integration $N_T$ is a integer multiple of M, then the cross-correlation function y(n) simplifies as follows:

if $$y(n) = \sum_{i=0}^{N_T-1} c_i x(n+i),$$

$$c_k = c_{k+1} = \ldots = c_{k+M-1} \quad k = 0, M, 2M, \ldots$$

then the cross-correlation can be rewritten as a sum of partial sums:

$$y(n) = \sum_{m=0}^{M-1} B_{n-m} \quad \text{Eq. 1}$$

$$B_n = \sum_{j=0}^{\frac{N_T}{M}-1} c_{jM} x(n+jM) \quad \text{Eq. 2}$$

where:
$N_T$ is the length of the short-time correlations,
$c_i$ is the $i^{th}$ filter tap,
x(n) is the input signal, and
y(n) is the output signal.

Using Equation 1, y(n) can further be rewritten as a function of y(n−1):

$$y(n) = y(n-1) + B_n - B_{n-M+1}$$

This implies that y(n) can be estimated using only a code-match filter of length $N_T/M$. So, with this innovation, the number of multipliers and supporting adders in the summation network in a CMF can be reduced by a factor M.

Figure 7A:
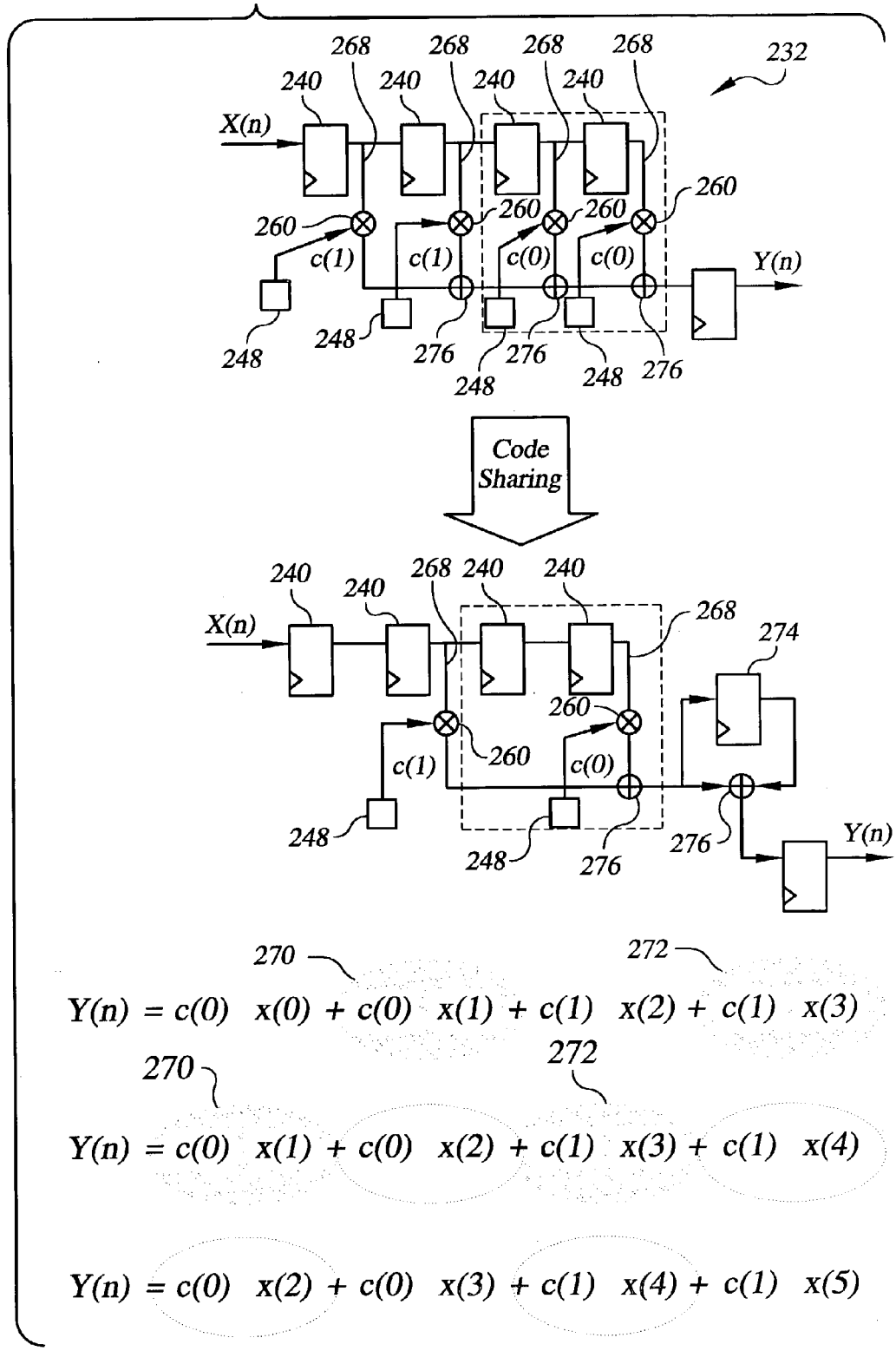
FIGS. 7A, 7B are block diagrams illustrating aspects of a code matched filter employing hardware sharing through reference signal (or replica code) register sharing.
Figure 7B:
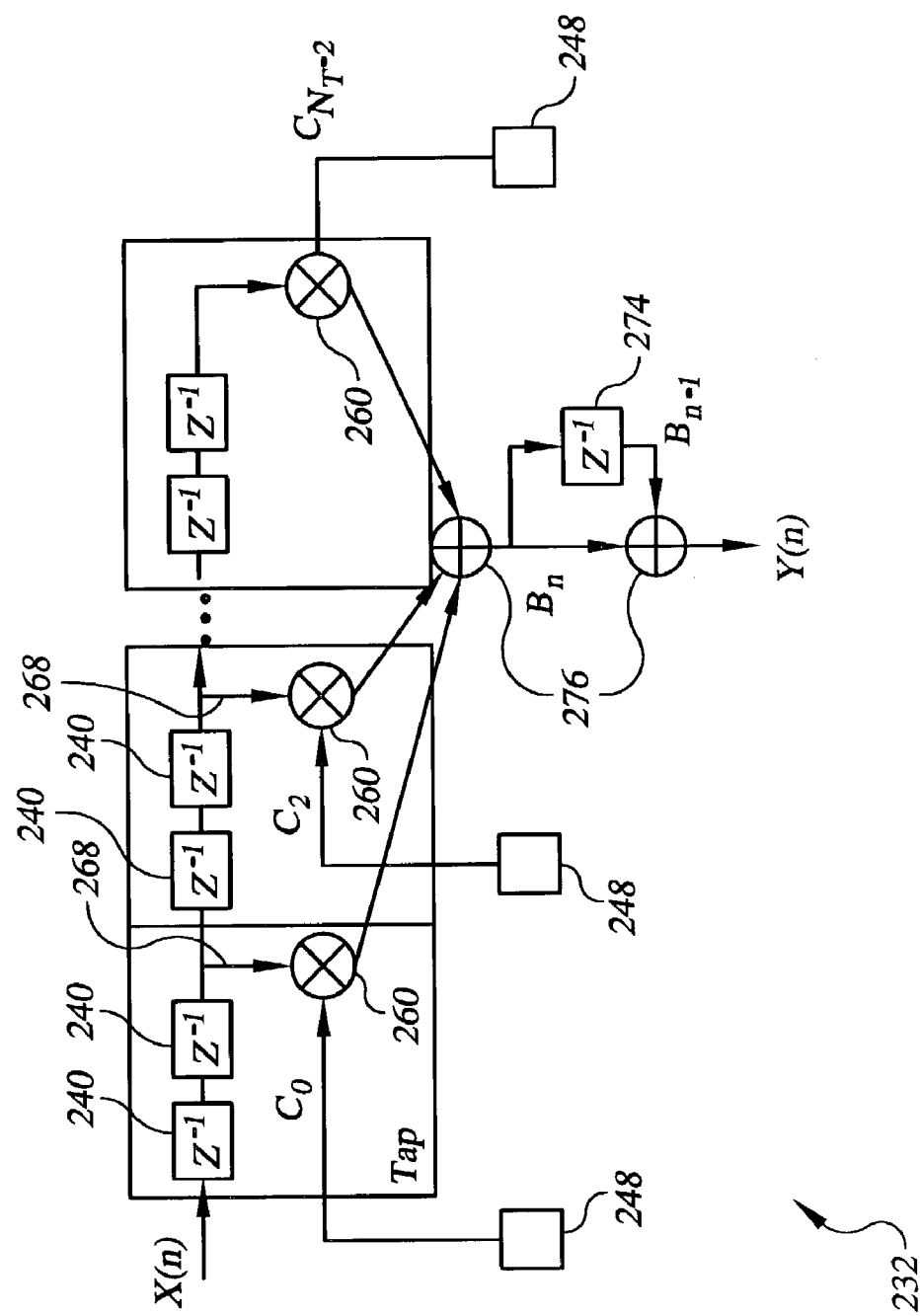

This is best understood with the aid of FIGS. 7A and 7B, which shows a simple CMF 232 having four taps 268. Rather than employing four multipliers 260 to multiply the same samples X(1), X(3) of input signal X(n) by the same reference code samples c(0), c(1) twice and obtaining identical partial products c(0)X(1) 270 and c(1)X(3) 272 twice for different CMF output signals Y(0) and Y(1) on consecutive clock cycles, CMF 232 stores in data shift register 274 the partial sum of the product the first time it is computed, then reuses it in computing the next sequential CMF output signal. Note that at the transition at the correlation block boundary or at the start of a new time-frequency tile, the partial sum of products register 274 must be cleared since the new correlation block would be corrupted by partial products generated by the previous correlation block's reference code. Another option is to ignore the outputs from the CMF at the transition until the pipeline is cleared.

This approach reduces the number of correlator taps 268 by an additional factor of two. The number of input data shift registers 240 for the input signal does not change, but overall the number of multipliers 260, replica code registers 248, and adder tree elements 276 required in the summing network is thus decreased by a factor of two, as shown in the lower circuit illustrated in FIG. 7A and in the alternative representation of FIG. 7B. Note that the summing network now has $$\sum_{i=0}^{\log \frac{N_T}{2}} 2^i$$

adder elements 276.

Quantization At Intermediate Processing Stage

Referring again to FIG. 3, certain embodiments of SPA 200 employ one or more intermediate quantizers 252 disposed between the bank of $N_cCMFs$ 232 and the FFT structure 236. This further reduces hardware complexity by reducing word-sizes of the STCs 234 prior to the Fourier analysis. Insertion of the one or more quantizers 252 reduces the required size of all subsequent circuits (i.e., FFTs, non-coherent integration hardware, and detection logic module) and off-chip memory requirements.

While the advantages of using quantizers at the input of acquisition SPAs to reduce circuit complexity are known (See J. Spilker, *Digital Communications by Satellite*, Prentice Hall, New Jersey, 1977), there are no acquisition SPAs known to the applicants that insert quantizers at an intermediate stage. In additive white Gaussian noise at sufficiently low input signal-to-noise-plus-interference ratios (SNIRs), processing loss due to quantization is limited to 0.7 dB loss for a 2-bit quantizer and 1.7 dB for a 1-bit quantizer. In most cases, the processing loss is amply compensated for by the significant reduction in hardware complexity. DSSS acquisition SPAs designed to receive low SNIR signals commonly assume a 1 or 2 bit input word size.

The maximum processing loss introduced by one or more quantizers 252 is a function of the SNIR and loading factor at each quantizer input. The predicted losses as a signal transitions from a low SNIR to a high SNIR (the situation found in the coherent cross-correlation processing) has not previously been accurately characterized through either theoretical or experimental analysis. Unlike the quantizer(s) located at the front end, where the selection of a 1 or 2 bit quantizer is satisfactory for all acquisition SPA designs and for most receive scenarios, the settings of intermediate quantizers 252 are highly dependent on the specific SPA 200 design and design parameters. Appropriate quantizer design parameters (step sizes, word sizes, and loading factors) may be determined by the application of the formulas below derived by the applicants that quantify the effects of quantization as a function of signal-to-noise ratio (SNR).

Specifically, by using Equation 3, a designer can determine the minimum word-size m required to achieve a desired quantizer efficiency e:

$$m = \log_2 \left[ \frac{2\sqrt{(\gamma_{STC}^2+1)}}{\lambda} \sqrt{\frac{e}{12(1-e)}} \right] \quad \text{(Eq. 3)}$$

Where $\lambda$ is a quantizer loading factor and $\gamma_{STC}^2$ is the SNIR at the output of each CMF 232. The efficiency e of intermediate quantizers 252 is defined as the ratio of the quantizer output signal-to-noise (SNR) to the input SNR and indicates the total increase in noise introduced by the one or more quantizers. For example, an efficiency of −1 dB normally implies that the noise power at the output of the quantizer is 1 dB higher than at the input.

The loading factor $\lambda$ is the ratio of the total input signal-plus-noise root-mean-squared (RMS) voltage to the quantizer's full scale voltage (FSV). The loading factor and the total input RMS voltage are used to select an FSV that prevents overflow or clipping. The optimum loading factor, normally specified in dB as $20\log_{10}\lambda$, is a function of the type of input signal and the number of bits. For an input sinusoid, the optimum loading factor is −3 dB ($\lambda=1/\sqrt{2}$). The optimum loading factor for a Gaussian signal varies as a function of the number of bits. Historically, −12 dB, ($\lambda=\frac{1}{4}$) has been used as the default value. Based on results obtained by Morgan, D., *Finite Limiting Effects for a Band-Limited Gaussian Random Process with Applications to A/D Conversion*, IEEE Transactions on Acoustics, Speech, and Signal Processing, Vol. 36, No. 7, July 1988, pp. 1011–1016, herein incorporated by reference, a simplified formula can be used for determining the loading factor for a Gaussian signal as a function of the number of bits, using two piecewise linear approximations:

$$\lambda_{dB} = -\left(\frac{m}{2} + 8\right), m \geq 8 \quad \text{(Eq. 4)}$$
$$\lambda_{dB} = -(m+4), m \leq 8$$

In practice, to determine the required output word-size of the quantizer, the designer would select a desired quantizer efficiency, select a quantizer loading factor and predict the maximum expected post-CMF SINR expected by the SPA. For the loading factor, the designer has the option of selecting a standard loading factor (e.g. $\lambda=\frac{1}{4}$) or by iteratively estimating the word-size (using Equation 3) and loading factor (using Equation 4) to determine the optimal word-size and loading factor pair. An AGC-like circuit can be employed to maintain these parameters at the desired levels.

Code Doppler Compensation

With reference again to FIG. 2, there are numerous causes of mismatch between the frequency of local replica code sequence oscillators 215 in SPA 200 embodiments and the corresponding frequency of the received signal 204. Two of these causes are oscillator drift and Doppler shift due to relative motion between the transmitter and the receiver. Regardless of the physical cause, it is common to refer to any frequency mismatch as caused by unknown Doppler.

For a truly narrowband transmitted signal (whose bandwidth is infinitesimal compared to its carrier frequency), any frequency mismatch produces a frequency shift of only the center frequency, and the FFT processing described above adequately searches over that unknown frequency offset. For a narrowband signal modeled as a baseband signal modulated onto a carrier, where the carrier frequency is much greater than the bandwidth of the baseband signal, the effect of frequency mismatch can often still be modeled to first order as a frequency shift of the entire signal.

When the Doppler shift and the time of interest are large compared to the bandwidth of the transmitted signal, however, the first-order model is no longer adequate. Time compression or expansion (known as companding) of the received baseband signal relative to the locally-generated reference signal produces lack of correlation, referred to herein as "code Doppler." Equivalently, varying Doppler shifts across the band occupied by the received signal 204 causes a loss of coherence. Processing gain is only obtained from long integration times when the processing compensates for this code Doppler.

The applicants have realized that the loss of coherence due to time companding of the baseband signal can be compensated by the use of short-time correlations followed by post-processing. (See J. W. Betz, "Performance of the Deskewed Short-Time Correlator," in *Coherence and Time Delay Estimation*, Edited by G. Clifford Carter, IEEE Press, 1993, J. W. Betz, "Effects of Uncompensated Relative Time Companding on a Broadband Cross Correlator," *IEEE Transactions on Acoustics, Speech, and Signal Processing*, Vol. ASSP-33, No. 3, June 1985, pp. 505–510, and J. W. Betz, "Comparison of the Deskewed Short-Time Correlator and the Maximum Likelihood Correlator, " *IEEE Transactions on Acoustics, Speech, and Signal Processing*, Vol. ASSP-32, No. 2, April 1984, pp. 285–294, each of which is herein incorporated by reference in their entirety.) Given appropriate selection of integration times for short-time correlations performed by cross correlation means 212, time companding introduces negligible loss of correlation, but does cause a non-trivial correlation peak location delay upon each short time correlation. Algorithm simplifications have been developed and analyzed in the cited references to exploit this phenomenon for low-pass signals.

Figure 8:
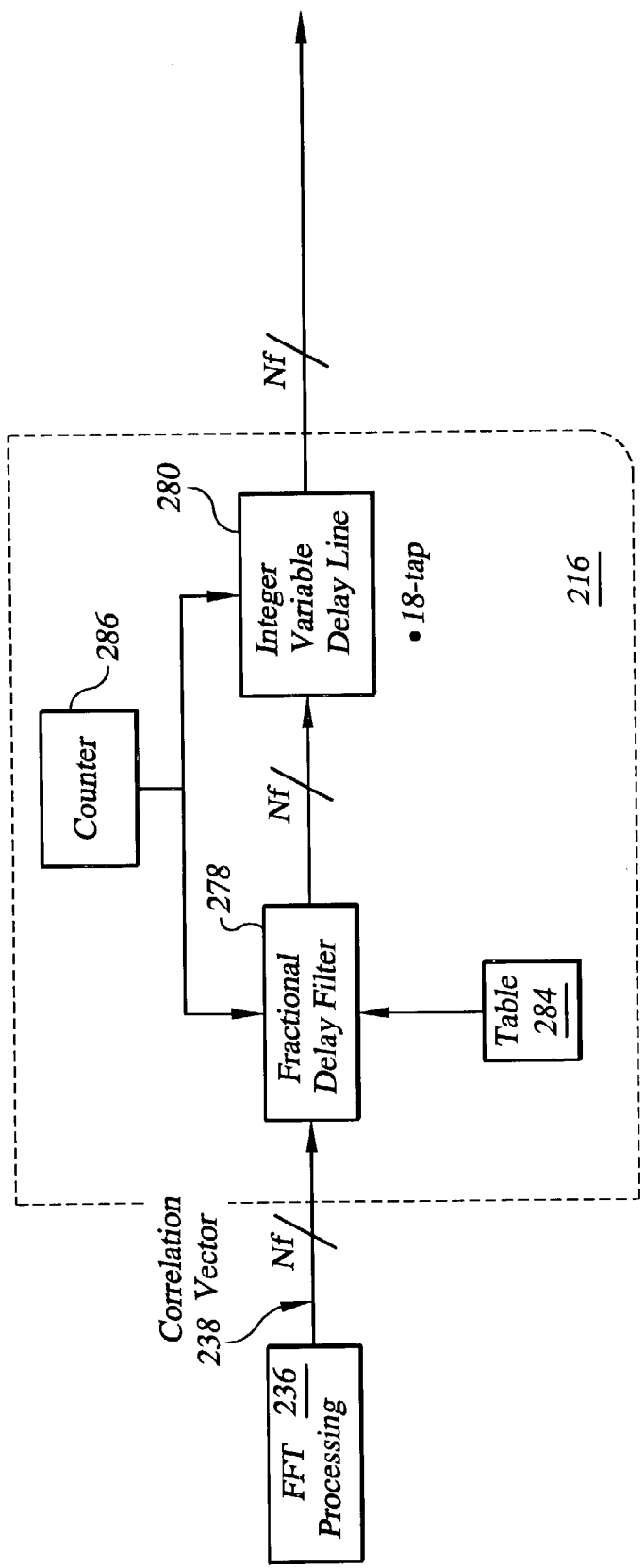
FIG. 8 is a block diagram illustrating aspects of a cod Doppler compensation means in accordance with the present invention.

The Doppler (or any frequency mismatch) between the received signal 204 and a reference signal (shown in the specific embodiment of FIG. 2 as the replica code sequence signal 213) may be modeled as producing both a frequency-shift and time-companding, both of which must be addressed in the acquisition processing of SPA 200. However, the frequency-shift and time-companding are both caused by the same frequency mismatch. An innovative approach described here exploits this relationship to implement a code Doppler compensator 216, an exploded view of which is illustrated in FIG. 8 as including one or more frequency-dependent fractional delay lines 278 and integer variable delay lines 280 to compensate for time companding in the frequency search.

The code Doppler compensator 216 design assumes that a constant nominal sampling and processing clock is utilized. As a result, any mismatch between the PN spreading code rate of the received signal 204 and the locally generated replica PN code rate will result in a "drifting" or "creeping" of the cross-correlation peak and must be compensated. Specifically, if there is a PN code mismatch, then during the non-coherent integration process that averages correlation blocks, the location of the actual correlation peak shows up at a slightly different location in time for each correlation block. If the received code is slower than the local code, the peak will show up later and later upon successive non-coherent integrations (or sums). If the received rate is faster, the peak will show up sooner upon each integration (or sum).

The relationship between the carrier frequency Doppler offset $\Delta f$ and the code rate Doppler offset $\Delta R$ is $$\Delta R = \Delta f \frac{R_{nom}}{f_{nom}}$$

The drift in samples, from the first to the $k^{th}$ non-coherent integration (or sum) can be predicted using the following formula:

$$\Delta n_k \approx 2T_i(k-1)(-\Delta R),$$

where $T_i$ is the coherent integration time in seconds. The implication of the drift is that only so many correlation blocks can be non-coherently integrated (or summed) without correction for the drift.

Since SPA 200 processes multiple frequencies at the same time using a FFT structure 236, the amount of drift is a function not only of the number of integrations but also the FFT bin number. For a bank of 16 CMFs and a 32-pt zero-padded FFT, the drift as a function of non-coherent integrations and code Doppler $\Delta R$ is as follows:

$$\Delta n_{kl} = -2(k-1)\left(T_i \Delta R + \frac{L_{bank}}{N_{FFT}} \frac{R_{nom}}{f_{nom}} l\right),$$

wherein $L_{bank}$ is the number of CMFs in the bank,
$\Delta R$ is the code Doppler shift,
$R_{nom}$ is the nominal chip rate,
$f_{nom}$ is the nominal carrier frequency, and
$N_{FFT}$ is the FFT size, $$l \in \left\{-\frac{N_{FFT}}{4}, \otimes, \left(\frac{N_{FFT}}{4} - 1\right)\right\}.$$

If no compensation is made for the drift of the correlation peak as a function of code Doppler offset and as the number of non-coherent integrations, increasing the number of integrations beyond a certain point provides no additional benefit. A code Doppler compensation circuit (or algorithm in software implementations) is required to predict the relative location of the correlation peak from correlation block-to-block and to apply the necessary delays to make sure the correlation peaks remained aligned.

To maximize the effects of non-coherent integration processing, series of correlation test statitistics 238 from different correlation blocks must be properly delayed (or advanced) for proper block-block correlation peak alignment. As each correlation block is processed, the one or more integer delay lines 280 and fractional delay lines 278 are initialized and/or updated to counteract the correlation peak drift. The same delays remain in effect during the calculation of an entire tile.

In the specific embodiment depicted, the fractional delay line 278 employs a 4-tap Lagrangian interpolator that uses a table 284 to assist in proper delay coefficient selection. In a practical example, only delay coefficients for 16 different delays (0–1 delay, 1/16 sample spacing) are required, however more could be used.

The delay of the integer variable delay line 280 is a function of both the code Doppler offset and the number of integrations performed. A correlation block counter 286 provides an indication of the number of integrations that have been performed. For exemplary purposes, a 18-tap integer variable delay line 280 is depicted. The following formula can be used to determine the required integer and fractional delays (or advances) required to be applied for each frequency bin:

$$\Delta n_{kl} = -2(k-1)\left(T_i \Delta R + \frac{L_{bank}}{N_{FFT}} \frac{R_{nom}}{f_{nom}} l\right) + (1200 + \Delta f)\frac{16}{2400},$$

where $\Delta f$ is the carrier frequency Doppler offset of bin 0. (In this case, $\Delta f$ refers to difference between the center of the band and the nominal carrier frequency.)

Code Doppler compensator 216 allows for longer non-coherent integration times, resulting in more efficient acquisition of weak signals.

Code and NCI Control Logic

The non-coherent addition of multiple correlation blocks to form a time-frequency tile requires a controller for controlling the loading and selecting of the code segment for correlation against the incoming signal and coordinating the processing of multiple correlation blocks to form a single time-frequency tile.

Figure 12:
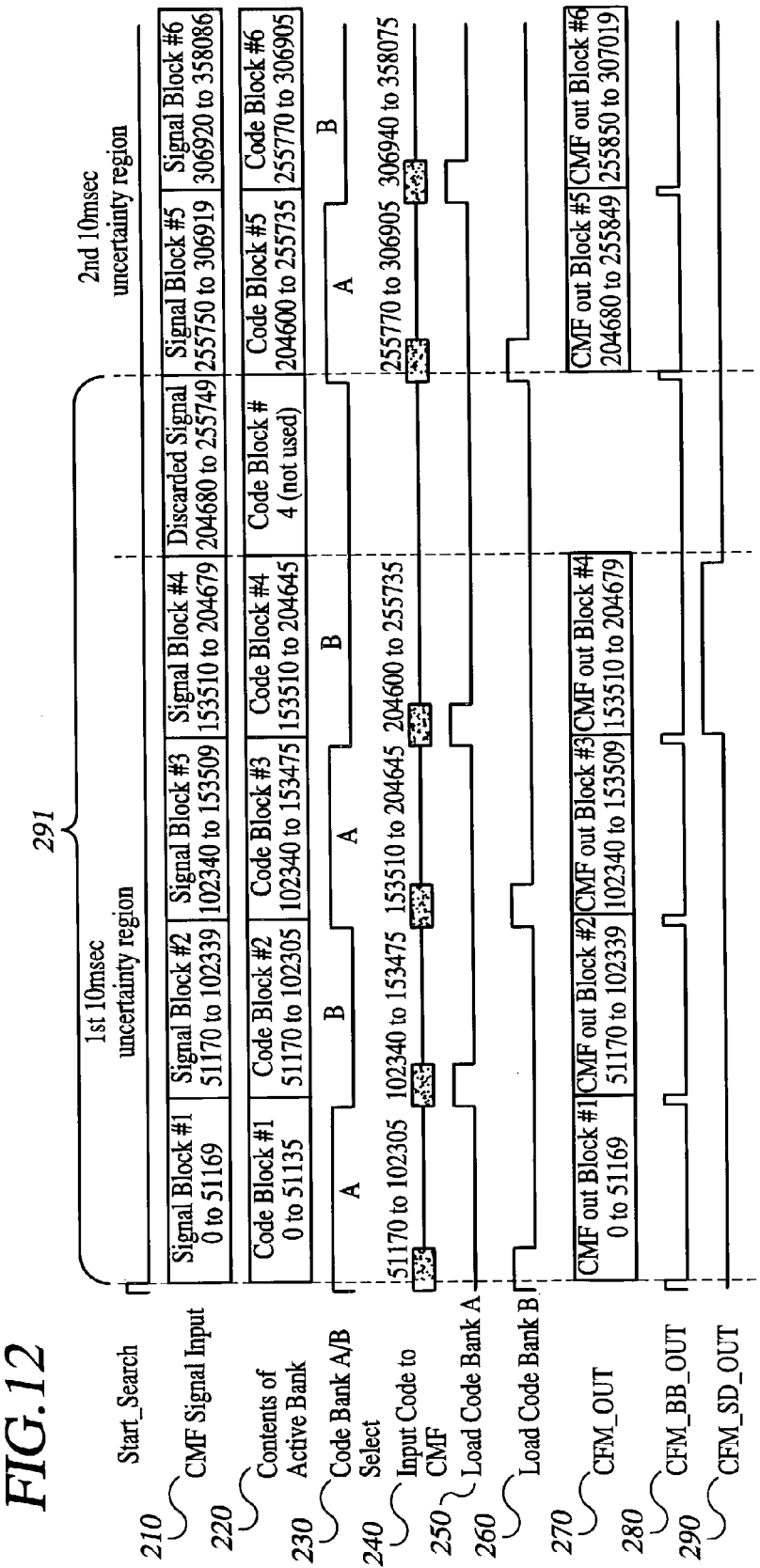
FIG. 12 is a chart illustrating relative timing and steps comprising a cycle of control unit 227.

Code and NCI control is implemented by control module 227, a programmable state-machine that generates the required control signals based on external triggers and the current program settings, e.g., data message rate, number of non-coherent additions, etc. FIG. 2 illustrates a number of the signal connections that control module 227 has with other components of SPA 200, and FIG. 12 illustrates the relative timing for a cycle of the control process for a SPA embodiment utilizing 10 ms coherent integration, four non-coherent additions, and two time uncertainty regions. Control module 227 provides signals to the cross-correlating means 212 for loading the replica code segments and for selecting the appropriate code bank. These signals are synchronized with the code generator 214 and system control signals, Block Boundary and Start Detection. The Block Boundary signal indicates the start of a correlation block, while the Start Detection signal indicates the final block of non-coherent integration and the start of detection processing.

For the purpose of this description, assume cross-correlating means 212 is comprised of two CMF banks. Before the start of a search cycle, control module 227 requests (at step 1210) the first block of code from code generator 214 and loads (at step 1220) the first block into one of the two code banks in cross-correlating means 212. When a search is initiated, control module 227 asserts (at step 1230) a Code Bank Select signal, requests (at step 1240) and loads (steps 1250, 1260) the next block of code from code generator 214, and asserts a Block Boundary signal (at step 1280).

The block boundary signal is aligned with a first valid correlation vector from cross-correlation means 212 and it is asserted at regular intervals 1291, approximately every 10 ms or 5 ms depending on the data message rate. The first Block Boundary signal instructs the processing modules (218, 216, 254, 210) to initialize and update their settings. In particular, the fractional and integer delay settings of Code Doppler compensation module 216 are initialized and the NCI module 218 initiates the start of a new non-coherent integration cycle. Subsequent Block Boundary signals adjust the code Doppler delay and controls the non-coherent integration process. In parallel with the assertion of the Block Boundary signal, the alternate code bank is selected and a new code block is requested and loaded.

During the last block of a non-coherent integration cycle, the Start Detection signal is asserted (in step 1290). This signal indicates the start of valid correlation vectors into the detection module 222. The negation of the Start Detection signal indicates the end of the detection process for a particular time uncertainty region. The Block Boundary signal following the negation of start detect reinitializes all the processing module settings, e.g., CMF code bank select, the code Doppler settings, and NCI buffer 220, for processing the next time uncertainty.

The finer details of the code and NCI control processing described above are influenced by four factors: the CMF filter length, the effects of code Doppler, an artifact of the code Doppler correction logic, and the implementation of the detection algorithm.

First, the CMF filter length is $(N_f * N_T)$ taps for a 50 Hz data message (10 ms) and $(N_f * N_T)/2$ taps for a 200 Hz data message (5 ms). Since the filter length is shorter than the ideal time uncertainty region of 10 ms or 5 ms, the correlation block length must be extended by fourteen and seven samples respectively to cover the entire time uncertainty region.

The second factor is related to code Doppler effects and occurs if a peak is located at the edge of a time uncertainty boundary. Partial peaks could appear in two consecutive time uncertainty regions due to code Doppler effects thus reducing optimal SNR of the correlation peak. The code and NCI control module 227 ensures that a full peak is in at least one of the time uncertainty regions by further extending the correlation block length by nine samples for the worst case code Doppler and maximum number of non-coherent integrations.

The third factor is introduced by the fractional delay filter 278 of Code Doppler compensator 216. Upon receiving a Block Boundary signal, new coefficients are loaded into fractional delay filter 278, which for the purpose of this description has four-taps. The fractional filter 278 produces four invalid outputs after coefficient loading. Due to the incorrect filter outputs, the correlation block length must be extended by four samples and the start detect signal is delayed by four samples relative to the last block boundary so that the detection module ignores the incorrect samples.

The final factor is a result of the implementation of detector 222. Detector 222 requires seven idle samples after the detection of a peak before a peak is declared valid. As a result, the correlation block length is extended another seven samples.

The above factors extend the correlation block size by maximum of thirty-four for the 10 msec case and twenty-seven for the 5 ms case. These four factors are controlled by a programmable parameter $N_x$. The NCI control logic 227 extends the interval between consecutive Block Boundary signals and the Code Bank Select signals to ensure that a block is longer than the CMF filter length by $N_X$ chips. The programmable parameter $N_X$ is computed using the following equation:

$$N_X = [N_{ideal} - (N_f * N_T)] + N_{overlap} + N_{discard} + N_{idle}$$

where $N_{ideal}$ is the ideal CMF filter length of 51,150 and 25,575 for 10 ms/5 ms, $N_{overlap}$ is the number of samples needed to account for code Doppler "drift", $N_{discard}$ is the number of samples discarded prior to detection to account for the code Doppler fractional delay filter, and $N_{idle}$ is the number of idle samples following a peak required by the detection logic 223.

For example, in the case of a 50 Hz data message rate and maximum number of non-coherent additions:

$$N_X = [51,150 - (51,136)] + 9 + 4 + 7 = 34$$

Two artifacts manifest from extending the correlation block length: consecutive code blocks for the same time uncertainty are non-contiguous and the reference code moves with respect to the symbol boundary. The non-contiguous code blocks are loaded into alternate banks of the cross-correlating means 212 during the processing of a time uncertainty region. Reference signal generator 214 provides the code such that the code blocks are realigned with the signal at the beginning of each block. The extended signal length for a correlation block has the effect of skewing the reference code with the symbol boundary. The reference code is realigned at the start of the next time uncertainty by delaying the block boundary signal. The first code block of time uncertainty n overlaps the last code block of time uncertainty n+1 since the external code generator rewinds the code generator to snap back to the symbol boundary. The interaction of the code and NCI control logic 227 with the external code generator 214 ensures that a peak that is at the edge of a time uncertainty region will not be lost. However, the same peak may appear in both time uncertainty regions and an external processor will be responsible for detecting duplicate peaks.

Separate Processing Of BOC Upper And Lower Sidebands

Figure 9:
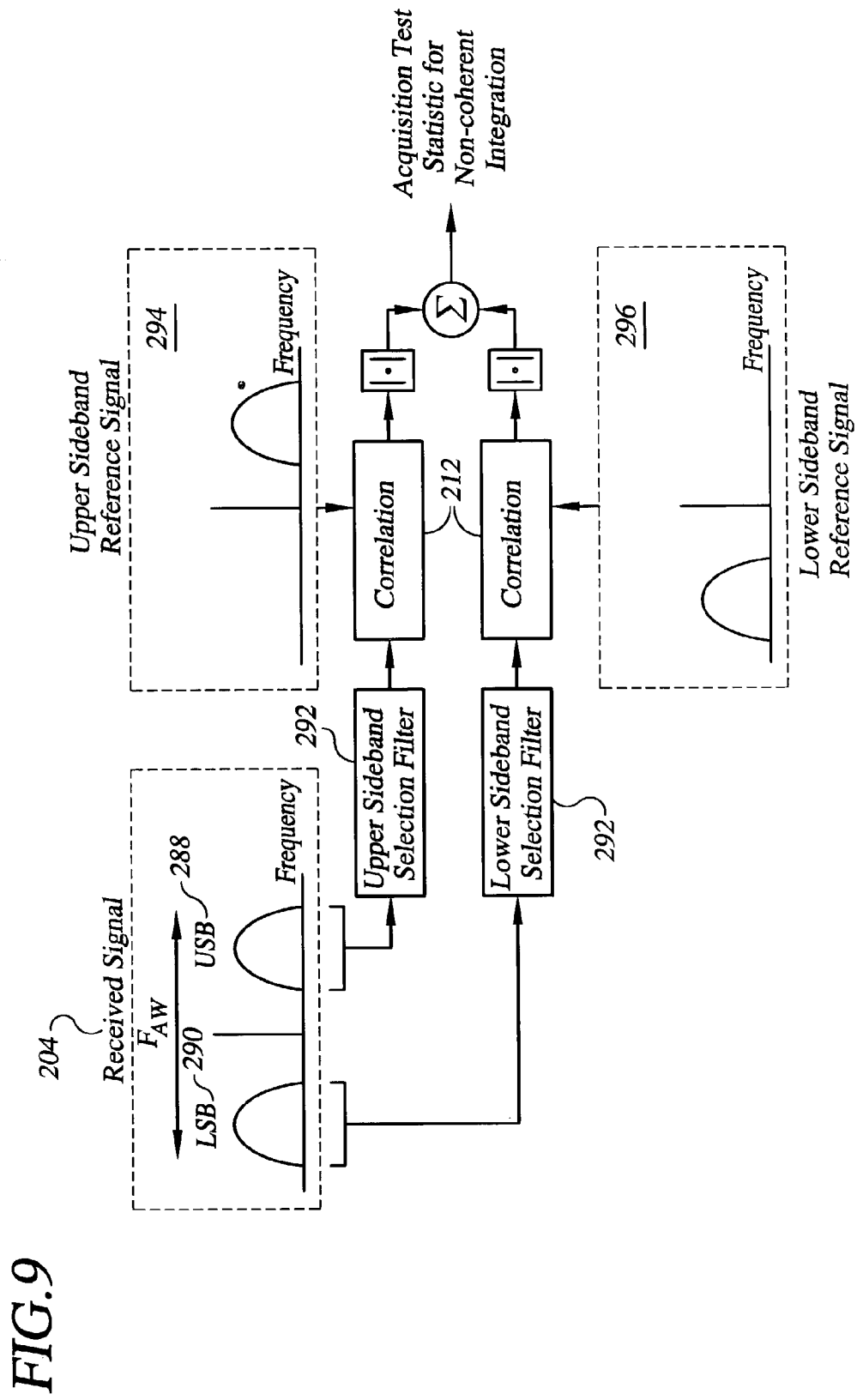
FIG. 9 is a block diagram illustrating aspects of a signal processing architecture employing separate sideband processing.

With reference to FIG. 9, BOC modulation methods use a square wave to produce signals having an upper sideband 288 and a lower sideband 290 containing exactly the same information, yielding a wider bandwidth than received signal 204. The sidebands 288,290 are fully coherent with each other. The received signal's subcarrier frequency and spreading code rate can be selected independently, offering considerable flexibility in signal design. Optimal performance for radionavigation is obtained by processing both sidebands 288,290 coherently in frequency, obtaining better signal-to-noise ratio and ranging accuracy. However, substantial simplification can be obtained in acquisition processing by treating upper sideband 288 and lower sideband 290 as two independent signals with identical spreading codes. A SPA 200 in accordance with this aspect of the invention further comprises filtering means 292 for separately digitally selecting and re-sampling each sideband of the received BOC modulated signal, followed by separate processing.

In the embodiment illustrated, each sideband is separately correlated with reference signals 294, 296 corresponding to the upper sideband 288 and lower sideband 290, respectively. The reference signals 294,296 are equivalent to that of a binary phase shift key (BPSK) modulated signal having the same spreading code rate as the received signal 204. The re-sampling rate is typically chosen to be twice the reciprocal of the spacing between the correlation peak and the nearest zero to the correlation peak. For a BPSK modulated signal, this re-sampling rate (e.g., 10.23 MHz) is typically twice the spreading code rate (e.g., 5.115 MHz). Short time correlation values resulting from the correlation means 212 processing of the sideband data are non-coherently combined, then non-coherently integrated over time. In contrast, conventional acquisition processing methods would process both sidebands of the signal coherently. And since the resulting wideband correlation function has much closer spacing between the peak of the correlation function and the nearest zero, a much higher sampling rate would be required.

For a fixed integration time, arithmetic operations are required to be executed at a rate approximately related to the square of the re-sampling rate. So, for a fixed coherent integration time, sideband processing using a much lower re-sampling rate provides significant simplification, even though the processing must be performed on both sidebands. Also, storage required in acquisition processing for a fixed integration time is approximately proportional to the re-sampling rate, so sideband processing provides a significant reduction in storage complexity as well. As analyzed in P. Fishman and J. W. Betz, "Predicting Performance of Direct Acquisition for the M Code Signal," *Proceedings of ION 2000 National Technical Meeting*, Institute of Navigation, January 2000, which is herein incorporated by reference, this separate sideband processing approach allows the re-sampling rate used in acquiring BOC(10,5) modulated signals to be reduced by approximately a factor of seven, compared to conventional wideband processing for acquisition. Separate sideband processing for acquisition thus reduces the required rate of arithmetic operations by a factor of approximately 25, and the storage used by a factor of approximately seven for a BOC(10,5) modulation. Employing the same rationale, for a BOC(5,1) modulation, this acquisition processing method allows the re-sampling rate used in acquisition to be reduced by approximately a factor of 50, compared to conventional wideband processing for acquisition. Separate sideband processing for acquisition thus reduces the required rate of arithmetic operations by a factor of more than 1000, and the storage used by a factor of approximately 50 for BOC(5,1).

Hardware Sharing Through Sideband Data Pipelining

Figure 10:
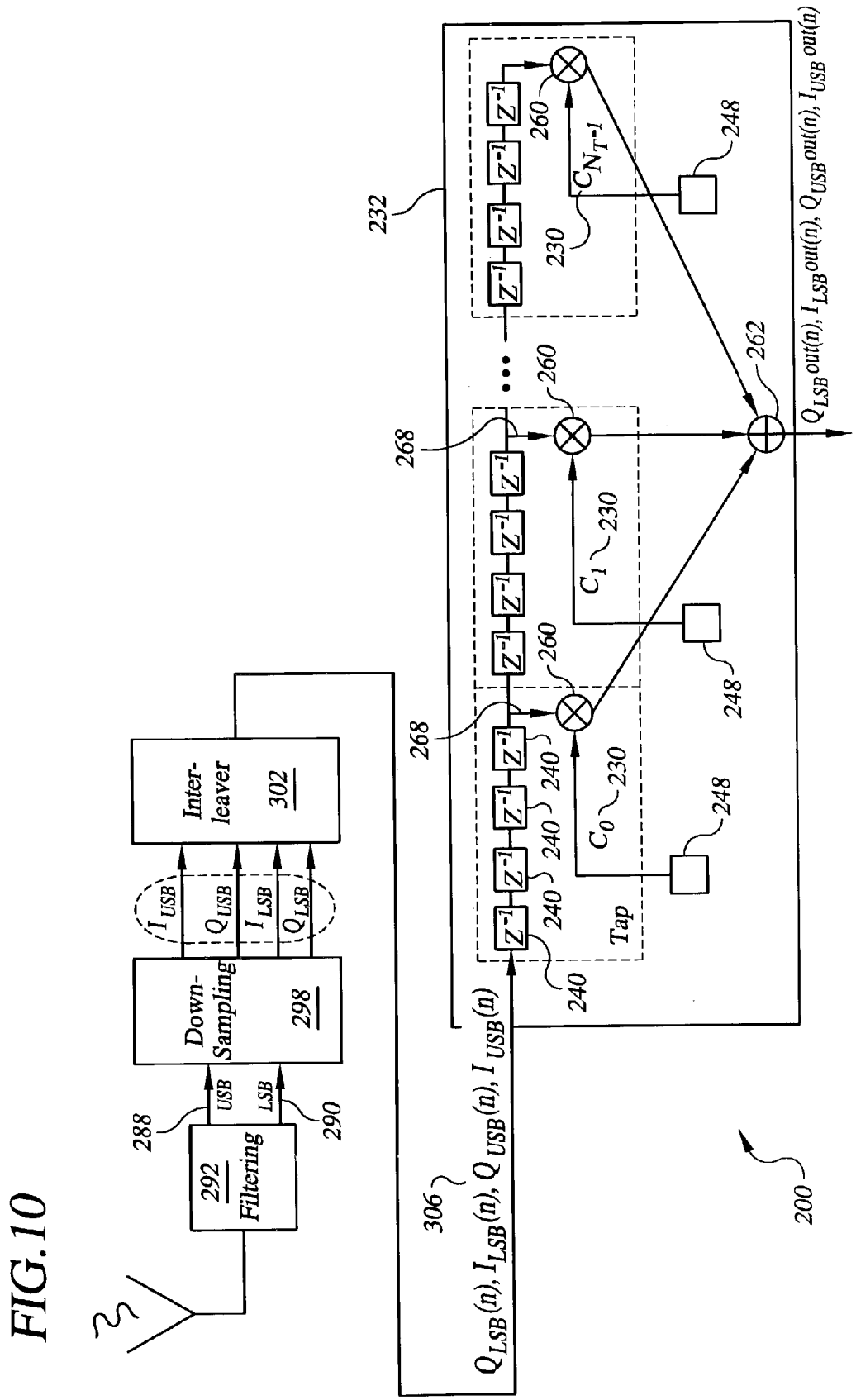
FIG. 10 is a block diagram illustrating aspects of a signal processing architecture employing hardware sharing through I and Q sideband data interleaving.

When acquiring multi-band the separate sideband processing described above, further opportunity exists to re-use CMF hardware even beyond the re-use enabled by interleaving and pipelining of the I and Q components of the received signal. Related to the concept described above of separately processing the upper and lower sidebands of a multiband received signal 300, and with reference to FIG. 10, selected SPA 200 embodiments re-use the same CMF hardware for processing both sidebands in a pipelined fashion. This hardware simplification is not restricted to signals having BOC modulations, but applies to any modulation with separable sidebands. The following describes the hardware optimizations that allow for sharing a CMF's hardware resources in this way.

A SPA 200 in accordance with this aspect of the invention further comprises a filtering means 292 for digitally selecting two (or more) sidebands 288,290 from the multiband received signal 300, means for down-sampling 298 the selected sidebands, and an interleaver 302 for interleaving the data 304 from the down-sampled sidebands. One or more bank of CMFs 232 then compute STCs for the interleaved sideband data 306 in a pipelined fashion. Each code matched filter 232 has a sufficient number of data shift registers 240 (four per tap 268 in the specific example illustrated) for temporarily storing the interleaved sideband data 306, and each CMF 232 operates at a rate that is twice the product of the number of selected sidebands and the rate at which sideband down-sampler 298 operates (i.e., the down-sampling rate).

This optimization is feasible because STCs computed by the CMFs 232 for the upper and lower sidebands employ identical replica code sequence samples 230. The approach simplifies each CMF's hardware by reducing the required number of multipliers 260, data shift registers 240, and summing network 262 adders by a further factor of two (a total factor of four as compared to acquisition SPAs not employing either technique). The CMF 232 of this specific example operates at four times the input signal down-sampling rate, which is well within the capabilities of navigation and communication system technologies.

Figure 11:
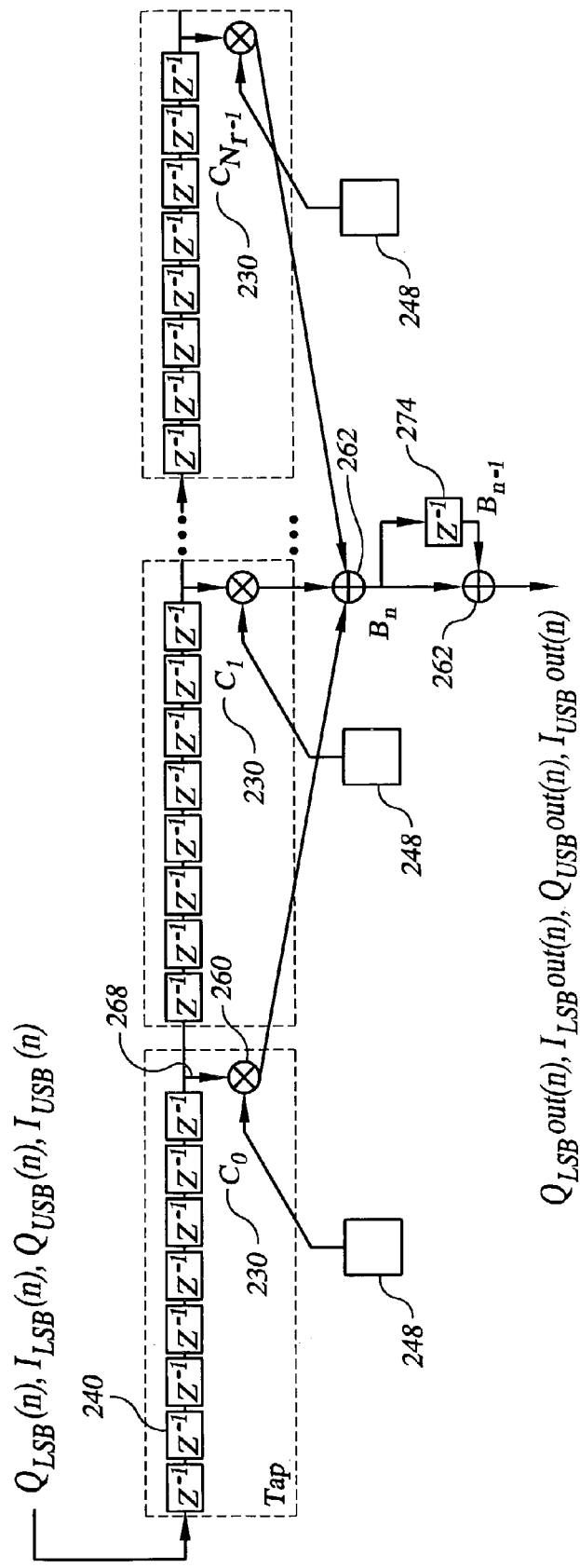
FIG. 11 is a block diagram illustrating aspects of a signal processing architecture employing reference signal (or replica code) register sharing and hardware sharing through I and Q sideband data interleaving.

FIG. 11 illustrates a portion of an embodiment of a cross-correlation means that leverages each of the hardware sharing techniques described above. Combining these techniques allows the acquisition SPA hardware (multipliers 260, summing network 262 adders, and replica code registers 248) to be reduced by an overall factor of approximately eight (8). This embodiment effectively computes two partial correlation products per tap 268, with CMF 232 operating at four times the input signal sampling rate.

CONCLUSION

While emphasis has been placed in the description above upon applications in radionavigation using BOC modulations and the GPS M code signal in particular, many of the techniques disclosed herein are much more broadly applicable. All of the innovations described herein apply to a broad set of BOC modulations, and not merely the BOC (10,5) modulation employed for the M code signal. Depending on the specific BOC parameters, the feasibility and benefits of these innovations may be greater or less than those for the M code signal. In general, both the feasibility and benefits improve for BOC modulations where the ratio of subcarrier frequency to spreading code rate is high.

Many of the designs apply also to modulations other than BOC. In particular, sideband acquisition processing applies to any modulation having separate sidebands. Use of a bank of code matched filters and an FFT-based frequency search and non-coherent integration applies to any modulation, as does carrier phase hardware sharing. Sideband-domain sharing of hardware applies to any modulation having separate sidebands, while code-domain sharing of hardware applies to virtually any modulation. The intermediate quantization and requantization and code Doppler compensation techniques have broad applicability to many applications.

While the M code signal uses a long spreading codes (i.e., spreading code with period of many seconds), the innovations described here also apply and are beneficial for signals using short codes. In fact, there are opportunities to use even simpler variants of the acquisition SPA if the signal is spread by a short code. If the initial time uncertainty is greater than the code period, for example, the circuit need search only over one period to find the phase of the code.

Even simpler variants of the acquisition SPA can be developed for situations where fast acquisition in high jamming is not required. One variant would be not to use non-coherent integration, eliminating the storage and processing required for non-coherent integration. This strategy would not produce much reduction in the size of an acquisition chip itself, however, since most of the on-chip hardware implements the CMFs, which would still be required. Another variant would be to use shorter coherent integration time through a combination of fewer CMFs and a smaller number of samples per short-time correlator, with non-coherent integration as needed. This variant would produce substantial reductions in on-chip hardware, while also reducing the ability to acquire fast in high levels of interference.

Other embodiments of the invention will be apparent to those skilled in the art from a consideration of the specification or practice of the invention disclosed herein. It is intended that the specification and examples herein be considered as exemplary only, with the true scope and spirit of the invention being indicated by the following claims.

We claim:

1. A signal processing architecture (SPA) for acquiring a received direct sequence spread spectrum (DSSS) signal, comprising:

means for sampling the received DSSS signal at a predetermined sampling rate;

means for cross-correlating, in a parallel fashion, time and frequency shifted versions of the sampled DSSS signal with samples of a locally generated replica of a pseudo random noise (PN) code sequence used to spread the spectrum of the received DSSS signal in order to obtain cross-correlation values;

a Doppler compensator coupled to the cross-correlating means for processing the obtained cross-correlation values in order to compensate for misalignment effects resulting from time-companding of the received DSSS signal;

an integrator for non-coherently integrating groups of the compensated cross-correlation values representing corresponding time and frequency offsets of different time segments of the received signal and replica code sequence in order to obtain correlation metrics; and a detector for detecting whether a sum of the magnitudes of the correlation metrics exceeds a detection threshold, wherein the cross-correlating means further comprises:

a bank of code matched filters for computing short-time correlations (STCs) entirely in parallel; and means for calculating the cross-correlation values utilizing discrete-time Fourier analysis of the computed STCs.

2. The SPA of claim 1, wherein the cross-correlating means further comprises one or more intermediate quantizers disposed between the bank of code matched filters and the cross-correlation calculation means for reducing wordsizes of the STCs prior to Fourier analysis.

3. The SPA of claim 1, wherein:

the code matched filters compute the STCs for interleaved in-phase (I) and quadrature (Q) components of the sampled DSSS signal in a pipelined fashion, the code matched filters operating at twice the sampling rate; and each code matched filter has two data shift registers per tap for holding the interleaved components.

4. The SPA of claim 1, wherein:

the DSSS signal has multiple sidebands;

the SPA further comprises means for digitally selecting and resampling two or more of the multiple sidebands;

the cross-correlating means further comprises an interleaver for interleaving data of the re-sampled sidebands;

the code matched filters compute the STCs for the interleaved sideband data in a pipelined fashion; and each code matched filter has additional data shift registers for holding the interleaved sideband data and operates at a rate equal to the product of the number of selected sidebands and the predetermined sampling rate.

5. The SPA of claim 1, wherein the cross-correlating means further comprises:

means for resampling the received DSSS signal at a rate equal to an integer multiple of the nominal chip rate;

one or more code matched filters having a plurality of multipliers whose required number is divided by the integer multiple; and wherein each code matched filter's associated summing network includes hardware for storing partial sums and adding partial sums from previous clock cycles in computing the cross-correlation values.

6. The SPA of claim 1, wherein the Doppler compensator further comprises:

delay means for applying delays to input streams of cross-correlation values corresponding to frequency-shifted versions of the received DSSS signal and the replica code sequence; and means for selecting appropriate delays to be applied based upon non-coherent integration counter values.

7. The SPA of claim 6, wherein the means for applying frequency-shifted-dependent delays further comprises:

one or more integer delay line filters;

one or more fractional delay line filters;

a pre-computed lookup table of filter coefficients for use by the integer delay line filters and fractional delay line filters in determining an appropriate delay to be applied; and means for initializing and updating integer and fractional delay line filter coefficients as a function of externally specified frequency shifts and the non-coherent integration counter values.

8. A signal processing architecture (SPA) for acquiring a received direct sequence spread spectrum (DSSS) signal, comprising:

means for sampling the DSSS signal at a predetermined sampling rate;

an interleaver for interleaving in-phase (I) and quadrature (Q) components of the sampled DSSS signal;

one or more code matched filters for correlating in a pipelined fashion time and frequency shifted versions of the interleaved components with samples of a replica of a pseudo random noise (PN) code sequence used to spread the spectrum of the received DSSS signal to obtain cross-correlation outputs, wherein each code matched filter operates at twice the sampling rate and includes two data shift registers per tap for holding the interleaved components;

means for calculating cross-correlation values utilizing discrete-time Fourier analysis of the cross-correlation outputs;

an integrator for non-coherently integrating the cross-correlation values representing corresponding time and frequency offsets of time segments of the received signal and replica code sequence to obtain correlation metrics; and a detector for detecting whether a sum of the magnitudes of the correlation metrics exceeds a detection threshold.

9. A signal processing architecture (SPA) for acquiring a received direct sequence spread spectrum (DSSS) signal having multiple sidebands, comprising:

means for sampling one or more of multiple sidebands at a predetermined sampling rate;

means for digitally selecting and resampling the one or more multiple sidebands;

an interleaver for interleaving data of the re-sampled sidebands;

one or more code matched filters for correlating in a pipelined fashion time and frequency shifted versions of the interleaved sideband data with samples of a replica of a PN code sequence used to spread the spectrum of the received DSSS signal to obtain cross-correlation outputs, the code matched filters each having additional data shift registers for holding the interleaved sideband data and each operating at a rate equal to the product of the number of selected sidebands and the predetermined sampling rate;

means for calculating cross-correlation values utilizing discrete-time Fourier analysis of the cross-correlation outputs;

an integrator for non-coherently integrating the cross-correlation values representing corresponding time and frequency offsets of time segments of the received signal and reference PN code sequence to obtain correlation metrics; and a detector for detecting whether a sum of the magnitudes of the correlation metrics exceeds a detection threshold.

10. A signal processing architecture (SPA) for acquiring a received direct sequence spread spectrum (DSSS) signal having at least two sidebands, comprising:

means for selecting a sideband of the received DSSS signal;

means for down-sampling the selected sideband at a predetermined sampling rate to obtain versions of the selected sideband;

an interleaver for interleaving in-phase (I) and quadrature (Q) components of the versions of the selected sideband;

means for cross-correlating a locally generated sampled replica of a pseudo-random noise (PN) code sequence used to spread the spectrum of the received DSSS signal with time and frequency shifted versions of the selected sideband to obtain cross-correlation values, wherein the cross-correlating means includes at least one of (i)–(vi):
  (i) means for re-sampling each selected sideband at a rate equal to an integer multiple of the nominal chip rate;
  (ii) a bank of code matched filters for computing short-time correlation (STCs) for the interleaved sideband components in a pipelined fashion, each code matched filter having a plurality of data shift registers per tap for holding the interleaved sideband components and operating at a rate equal to the product of twice the number of sampled sidebands and the predetermined sampling rate;
  (iii) a bank of code matched filters for computing short-time correlations (STCs) entirely in parallel;
  (iv) one or more code matched filters having a plurality of multipliers whose required number is divided by the integer multiple, wherein each code matched filter's associated summing network has a hardware means for storing partial sums and adding partial sums from previous clock cycles in computing the cross-correlation values;
  (v) means for calculating the cross-correlation values utilizing discrete-time Fourier analysis of the STCs; and
  (vi) one or more intermediate quantizers disposed between the bank of code matched filters and the cross-correlation calculation means for reducing word-sizes of the STCs prior to Fourier analysis;

a Doppler compensator coupled to the cross-correlating means for processing the obtained cross-correlation values in order to compensate for misalignment effects resulting from time-companding of the received DSSS signal, wherein the Doppler compensator includes at least one of(a)–(d):
  (a) one or more integer delay line filters for coarse Doppler frequency dependent compensation;
  (b) one or more fractional delay line filters for fine Doppler frequency dependent compensation;
  (c) a table of filter coefficients for use by the fractional delay line filters in finely resolving Doppler frequency-dependent delays; and
  (d) externally controllable settings for applying the appropriate integer and fractional delays to each cross-correlation value; and a detector for detecting whether the magnitude of the cross-correlation values exceeds a detection threshold.

11. A signal processing architecture (SPA) for acquiring a received multiband input signal comprising:
  means for selecting multiple sidebands from the received multiband input signal;
  means for down-sampling each selected sideband at a predetermined sampling rate to obtain versions of each selected sideband;
  an interleaver for interleaving in-phase (I) and quadrature (Q) components of the versions of each selected sideband;
  means for cross-correlating a replica of a pseudo random noise (PN) code sequence used to spread the spectrum of the received signal with time and frequency shifted versions of each selected sideband to obtain cross-correlation values, wherein the cross-correlating means further comprises a bank of code matched filters for computing short-time correlations (STCs) for the interleaved sideband components in a pipelined fashion, each code matched filter having a plurality of data shift registers per tap for holding the interleaved components and operating at a rate equal to the product of twice the number of sampled sidebands and the predetermined sampling rate;
  an integrator for non-coherently combining the cross-correlation values to obtain correlation metrics; and
  a detector for detecting whether the magnitudes of the correlation metrics exceed a detection threshold.

12. The SPA of claim 11, further comprising:
  one or more intermediate quantizers for independently quantizing the versions of each selected sideband; and
  circuitry for controlling a loading factor of the quantizing means.

13. The SPA of claim 12, wherein the loading factor control circuitry is an AGC like circuit.

14. The SPA of claim 11, wherein the cross-correlating means further comprises:
  a bank of code matched filters for computing short-time correlations (STCs) entirely in parallel; and
  means for calculating the cross-correlation values utilizing discrete-time Fourier analysis of the STCs.

15. The SPA of claim 14, wherein the cross-correlating means further comprises:
  one or more intermediate quantizers disposed between the bank of code matched filters and the cross-correlation calculation means for reducing word-sizes of the STCs prior to Fourier analysis.

16. The SPA of claim 11, wherein the cross-correlating means further comprises:
  means for resampling each selected sideband at a rate equal to an integer multiple of the nominal chip rate;
  one or more code matched filters having a plurality of multipliers whose required number is divided by the integer multiple; and wherein each code matched filter's associated summing network has a hardware means for storing partial sums and adding partial sums from previous clock cycles in computing the cross-correlation values.

17. The SPA of claim 11, further comprising: Doppler compensator coupled to the cross-correlating means for processing the obtained cross-correlation values in order to compensate for misalignment effects resulting from time-companding of the received DSSS signal.

18. The SPA of claim 17, wherein the Doppler compensator further comprises:
  one or more integer delay line filters for coarse Doppler frequency dependent compensation;
  one or more fractional delay line filters for fine Doppler frequency dependent compensation;
  a table of filter coefficients for use by the fractional delay line filters in finely resolving Doppler frequency-dependent delays; and
  externally controllable settings for applying the appropriate integer and fractional delays to each cross-correlation value.

19. The SPA of claims 1, 8, 9 or 11, wherein the non-coherent integrator further comprises:
  means for controlling relative timing between the replica code sequence and the received signal;

means for realigning the replica code sequence at the start of a new time uncertainty;

means for integrating multiple correlation blocks; and wherein code sequence segments overlapping in time between groups of cross-correlation values compensate for invalid samples resulting from Doppler compensation, post peak-detection idle time resulting from a peak being detected at the end of a tile, and a change in the number of samples available for processing as a result of code Doppler effects.

20. The SPA of claim 19, wherein the non-coherent integrator further comprises means for:

loading and swapping of code matched filter registers containing consecutive non-contiguous code sequence segments to support the seamless switching between processing multiple blocks of a tile and for controlling the realignment of the received signal to the symbol boundary along with the local reference code when switching time uncertainties;

controlling initiation of a new block for a given time offset during the NCI process;

controlling a signal that distinguishes invalid data from the code Doppler processing and the valid data at the end of the NCI process; and controlling discarding the unused signal at the end of the NCI processing for a given time uncertainty and coordinating the start of the NCI processing for the next time uncertainty.

21. The SPA of claims 1, 8–10 or 11, wherein the SPA is implemented in a single ASIC.

22. The SPA of claim 21, wherein off-chip memory is used only to store non-coherent integration results.

23. The SPA of claims 1, 8–10 or 11, wherein the SPA is implemented in a single FPGA.

24. The SPA of claim 23, wherein off-chip memory is used only to store non-coherent integration results.

25. The SPA of claims 1, 8, 9 or 10, wherein the DSSS signal to be acquired is a binary offset carrier modulated signal.

26. The SPA of claims 1, 8, 9 or 10, wherein the DSSS signal to be acquired is a GPS M-code signal.

27. A cross-correlation apparatus for cross-correlating a sampled reference signal with time and frequency shifted samples of a received signal that was sampled at a predetermined sampling rate, comprising:

an interleaver for interleaving in-phase (I) and quadrature (Q) components of the sampled received signal;

a bank of code matched filters for computing short-time correlations (STCs) for the interleaved components in a pipelined fashion, the code matched filters operating at twice the predetermined sampling rate and each having two data shift registers per tap for holding the interleaved components; and means for calculating cross-correlation values utilizing discrete-time Fourier analysis of the STCs.

28. A cross-correlation apparatus for cross-correlating a sampled reference signal with time and frequency shifted samples of a received signal having multiple sidebands one or more of which were sampled at a predetermined sampling rate, comprising:

means for digitally selecting and resampling one or more of the multiple sidebands;

an interleaver for interleaving data components of the one or more re-sampled sidebands;

a bank of code matched filters for computing short-time correlations (STCs) for the interleaved sideband data in a pipelined fashion, each code matched filter having additional data shift registers for holding the interleaved sideband data and operating at a rate equal to the product of the number of selected sidebands and the predetermined sampling rate; and means for calculating cross-correlation values utilizing discrete-time Fourier analysis of the STC outputs.

29. A cross-correlation apparatus for cross-correlating a sampled pseudo random noise (PN) code reference signal with time and frequency shifted samples of a received signal, comprising:

means for resampling the received signal at a rate equal to an integer multiple of the nominal chip rate;

a bank of code matched filters for computing short-time correlations (STCs) in a parallel fashion of the re-sampled received signal and sampled reference signal, each code matched filter having a plurality of multipliers whose required number is divided by the integer multiple; and wherein each code matched filter's associated summing network has a hardware for storing partial sums and adding partial sums from previous clock cycles to compute cross-correlation values.

30. A signal processing architecture (SPA) for acquiring a received direct sequence spread spectrum (DSSS) signal, comprising:

means for sampling the received DSSS signal at a predetermined sampling rate;

means for cross-correlating, in a parallel fashion, time and frequency shifted versions of the sampled DSSS signal with samples of a locally generated replica of a pseudo random noise (PN) code sequence used to spread the spectrum of the received DSSS signal in order to obtain cross-correlation values;

a Doppler compensator coupled to the cross-correlating means for processing the obtained cross-correlation values in order to compensate for misalignment effects resulting from time-companding of the received DSSS signal;

an integrator for non-coherently integrating groups of the compensated cross-correlation values representing corresponding time and frequency offsets of different time segments of the received signal and replica code sequence in order to obtain correlation metrics; and a detector for detecting whether a sum of the magnitudes of the correlation metrics exceeds a detection threshold, wherein the Doppler compensator further comprises:

delay means for applying delays to input streams of cross-correlation values corresponding to frequency-shifted versions of the received DSSS signal and the replica code sequence; and means for selecting appropriate delays to be applied based upon non-coherent integration counter values.

31. The SPA of claim 30, wherein the cross-correlating means further comprises:

a bank of code matched filters for computing short-time correlations (STCs) entirely in parallel; and means for calculating the cross-correlation values utilizing discrete-time Fourier analysis of the computed STCs.

32. The SPA of claim 31, wherein the cross-correlating means further comprises one or more intermediate quantizers disposed between the bank of code matched filters and the cross-correlation calculation means for reducing word-sizes of the STCs prior to Fourier analysis.

33. The SPA of claim 31, wherein:

the code matched filters compute the STCs for interleaved in-phase (I) and quadrature (Q) components of the sampled DSSS signal in a pipelined fashion, the code matched filters operating at twice the sampling rate; and each code matched filter has two data shift registers per tap for holding the interleaved components.

34. The SPA of claim 31, wherein:
the DSSS signal has multiple sidebands;
the SPA further comprises means for digitally selecting and resampling two or more of the multiple sidebands;
the cross-correlating means further comprises an interleaver for interleaving data of the re-sampled sidebands;
the code matched filters compute the STCs for the interleaved sideband data in a pipelined fashion; and
each code matched filter has additional data shift registers for holding the interleaved sideband data and operates at a rate equal to the product of the number of selected sidebands and the predetermined sampling rate.

35. The SPA of claim 31 wherein the cross-correlating means further comprises:
means for resampling the received DSSS signal at a rate equal to an integer multiple of the nominal chip rate;
one or more code matched filters having a plurality of multipliers whose required number is divided by the integer multiple; and
wherein each code matched filter's associated summing network includes hardware for storing partial sums and adding partial sums from previous clock cycles in computing the cross-correlation values.

36. The SPA of claim 30, wherein the means for applying frequency-shifted-dependent delays further comprises:
one or more integer delay line filters;
one or more fractional delay line filters;
a pre-computed lookup table of filter coefficients for use by the integer delay line filters and fractional delay line filters in determining an appropriate delay to be applied; and
means for initializing and updating integer and fractional delay line filter coefficients as a function of externally specified frequency shifts and the non-coherent integration counter values.

37. A signal processing architecture (SPA) for acquiring a received direct sequence spread spectrum (DSSS) signal, comprising:
means for sampling the received DSSS signal at a predetermined sampling rate;
means for cross-correlating, in a parallel fashion, time and frequency shifted versions of the sampled DSSS signal with samples of a locally generated replica of a pseudo random noise (PN) code sequence used to spread the spectrum of the received DSSS signal in order to obtain cross-correlation values;
a Doppler compensator coupled to the cross-correlating means for processing the obtained cross-correlation values in order to compensate for misalignment effects resulting from time-companding of the received DSSS signal;
an integrator for non-coherently integrating groups of the compensated cross-correlation values representing corresponding time and frequency offsets of different time segments of the received signal and replica code sequence in order to obtain correlation metrics; and
a detector for detecting whether a sum of the magnitudes of the correlation metrics exceeds a detection threshold, wherein the cross-correlating means further comprises:
a bank of code matched filters for computing short-time correlations (STCs) entirely in parallel; and
means for calculating the cross-correlation values utilizing discrete-time Fourier analysis of the computed STCs; and
wherein the Doppler compensator further comprises:
delay means for applying delays to input streams of cross-correlation values corresponding to frequency-shifted versions of the received DSSS signal and the replica code sequence; and
means for selecting appropriate delays to be applied based upon non-coherent integration counter values.

38. The SPA of claim 37, wherein the cross-correlating means further comprises one or more intermediate quantizers disposed between the bank of code matched filters and the cross-correlation calculation means for reducing word-sizes of the STCs prior to Fourier analysis.

39. The SPA of claim 37, wherein:
the code matched filters compute the STCs for interleaved in-phase (I) and quadrature (Q) components of the sampled DSSS signal in a pipelined fashion, the code matched filters operating at twice the sampling rate; and
each code matched filter has two data shift registers per tap for holding the interleaved components.

40. The SPA of claim 37, wherein:
the DSSS signal has multiple sidebands;
the SPA further comprises means for digitally selecting and resampling two or more of the multiple sidebands;
the cross-correlating means further comprises an interleaver for interleaving data of the re-sampled sidebands;
the code matched filters compute the STCs for the interleaved sideband data in a pipelined fashion; and
each code matched filter has additional data shift registers for holding the interleaved sideband data and operates at a rate equal to the product of the number of selected sidebands and the predetermined sampling rate.

41. The SPA of claim 37 wherein the cross-correlating means further comprises:
means for resampling the received DSSS signal at a rate equal to an integer multiple of the nominal chip rate;
one or more code matched filters having a plurality of multipliers whose required number is divided by the integer multiple; and
wherein each code matched filter's associated summing network includes hardware for storing partial sums and adding partial sums from previous clock cycles in computing the cross-correlation values.

42. The SPA of claim 37, wherein the means for applying frequency-shifted-dependent delays further comprises:
one or more integer delay line filters;
one or more fractional delay line filters;
a pre-computed lookup table of filter coefficients for use by the integer delay line filters and fractional delay line filters in determining an appropriate delay to be applied; and
means for initializing and updating integer and fractional delay line filter coefficients as a function of externally specified frequency shifts and the non-coherent integration counter values.

* * * * *